United States Patent
An et al.

(10) Patent No.: US 9,960,800 B2
(45) Date of Patent: May 1, 2018

(54) CRADLE ASSEMBLY FOR VEHICLE CAPABLE OF CONNECTING WITH MOBILE TERMINAL

(71) Applicant: LG ELECTRONICS INC., Seoul (KR)

(72) Inventors: Sungje An, Seoul (KR); Jeongeun Shin, Seoul (KR); Sukjin Chang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 15/388,661

(22) Filed: Dec. 22, 2016

(65) Prior Publication Data

US 2017/0179989 A1 Jun. 22, 2017

(30) Foreign Application Priority Data

Dec. 22, 2015 (KR) .......................... 10-2015-0183508

(51) Int. Cl.
| | |
|---|---|
| *H04M 1/00* | (2006.01) |
| *H04B 1/3877* | (2015.01) |
| *H04B 1/3822* | (2015.01) |
| *H04W 12/06* | (2009.01) |
| *H04B 1/38* | (2015.01) |

(52) U.S. Cl.
CPC ......... *H04B 1/3877* (2013.01); *H04B 1/3822* (2013.01); *H04W 12/06* (2013.01)

(58) Field of Classification Search
CPC ........................... H04B 1/3877; H04M 1/6058
USPC ........................................... 455/569.2, 575.9
See application file for complete search history.

(56) References Cited

U.S. PATENT DOCUMENTS

| | | | |
|---|---|---|---|
| 2008/0174136 A1 | 7/2008 | Welschholz et al. | |
| 2011/0259789 A1 | 10/2011 | Fan | |
| 2013/0148289 A1* | 6/2013 | Kwon | ................... G06F 1/1632 361/679.43 |
| 2013/0240587 A1 | 9/2013 | Buchhalter | |
| 2015/0350397 A1* | 12/2015 | Vourlat | ............... B60R 11/0235 455/575.9 |

FOREIGN PATENT DOCUMENTS

| | | |
|---|---|---|
| JP | 2007131037 | 5/2007 |
| KR | 10-2012-0091895 | 8/2012 |
| KR | 10-2014-0019665 | 2/2014 |

OTHER PUBLICATIONS

International Search Report in International Application No. PCT/KR2016/014067, dated Apr. 3, 2017, 3 pages (with English translation).

* cited by examiner

*Primary Examiner* — Lee Nguyen

(74) *Attorney, Agent, or Firm* — Fish & Richardson P.C.

(57) ABSTRACT

Disclosed is a cradle assembly for a vehicle capable of connecting with a mobile terminal, including a cover unit configured to open or close an accommodation space defined in a dashboard panel by pivoting, a binding unit attached to a lower end of the cover unit so as to fix an upper end of the mobile terminal, and a support unit configured to support the mobile terminal in a state in which a lower end of the mobile terminal is seated therein. Whether or not the cover unit is pivotable is determined based on whether or not the mobile terminal is electrically connected to the vehicle.

19 Claims, 41 Drawing Sheets

CRADLE ASSEMBLY FOR VEHICLE CAPABLE OF CONNECTING WITH MOBILE TERMINAL

CROSS-REFERENCE TO RELATED APPLICATION

This application claims the priority benefit of Korean Patent Application No. 10-2015-0183508 filed on Dec. 22, 2015 in the Korean Intellectual Property Office, the disclosure of which is incorporated herein by reference.

BACKGROUND OF THE INVENTION

1. Field of the Invention

The present invention relates to a cradle assembly for a vehicle capable of connecting with a mobile terminal.

2. Description of the Related Art

In recent years, the many and various functions of mobile terminal have had an effect on the vehicle field, and enable the more comfortable and safe driving of occupants (including a driver) beyond the inherent transportation function of vehicles.

However, because a large number of various functional operating units are provided inside a vehicle, it is necessary to provide an additional cradle assembly capable of connecting a mobile terminal with the internal system of the vehicle.

However, an existing navigation system, black box device, automated tollgate payment device, and the like are installed in the vicinity of around a front dashboard panel near a driver's seat and a front passenger seat, which crowds the front region of a passenger compartment and makes it difficult for the driver to perform safe driving.

In addition, when installing a mobile terminal in the vehicle, there is the risk of an accident when a user operates the mobile terminal while driving.

SUMMARY OF THE INVENTION

It is an object of the present invention to provide a cradle assembly for a vehicle capable of connecting with a mobile terminal, which assists a driver in safely operating the mobile terminal while driving.

Objects of the present invention should not be limited to the aforementioned object and other not-mentioned objects will be clearly understood by those skilled in the art from the following description.

In accordance with an embodiment of the present invention, the above and other objects can be accomplished by the provision of a cradle assembly for a vehicle capable of connecting with a mobile terminal, including a cover unit configured to open or close an accommodation space defined in a dashboard panel by pivoting, a binding unitbinding unit attached to a lower end of the cover unit so as to fix an upper end of the mobile terminal, and a support unit configured to support the mobile terminal in a state in which a lower end of the mobile terminal is seated therein, wherein whether or not the cover unit is pivotable is determined based on whether or not the mobile terminal is electrically connected to the vehicle.

Detailed items of other embodiments are included in the following description and the accompanying drawings.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

Figure 1:
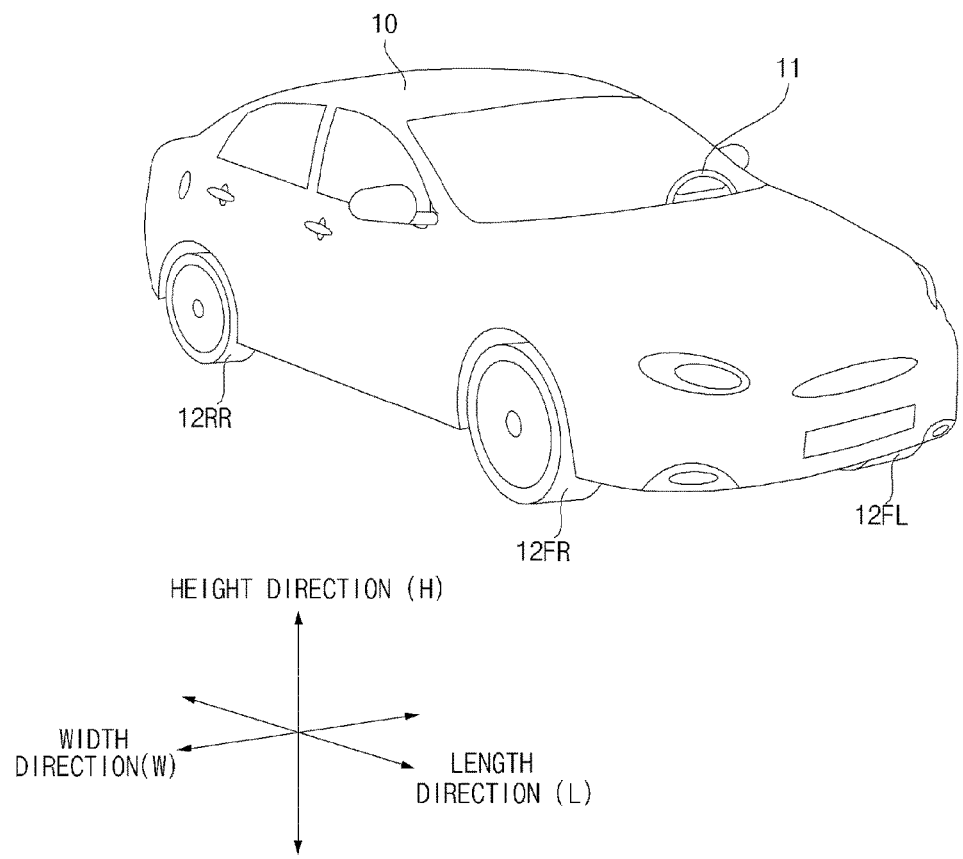
FIG. 1 is a view illustrating the external appearance of a vehicle, which includes a vehicular cradle assembly capable of connecting with a mobile terminal in accordance with an embodiment of the present invention.

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, suffixes "module" and "unit" are given or mingled with each other only in consideration of ease in the preparation of the specification, and do not have or serve as different meanings. Accordingly, the suffixes "module" and "unit" may be mingled with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit technical ideas disclosed in the present specification. Therefore, it should be understood that the accompanying drawings include all modifications, equivalents and substitutions included in the scope and sprit of the present invention.

It will be understood that although the terms first, second, etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present. In addition, it will be understood that when a component is referred to as "controlling" another component, it may directly control another component, or may also control another component via the mediation of a third component. In addition, it will be understood that when a component is referred to as "providing" another component with information and signals, it may directly provide another component with the same and may also provide another component the same via the mediation of a third component.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

In the following description, the "left side" refers to the left side relative to the forward traveling direction of the vehicle, and the "right side" refers to the right side relative to the forward traveling direction of the vehicle.

In addition, in the following description, the "front side" refers to the heading direction on the basis of the traveling direction of the vehicle, and the "rear side" refers to the reverse direction on the basis of the traveling direction of the vehicle.

In addition, as used herein, the term "downward" refers to the direction facing the ground surface, and the term "upward" refers to the direction opposite the downward direction.

In addition, as used herein with regard to an attachment unit, "the front surface of the attachment unit" refers to the surface facing the rear side of the vehicle, and the term "the rear surface of the attachment unit" refers to the surface facing the front side of the vehicle.

FIG. 1 is a view illustrating the external appearance of a vehicle in accordance with an embodiment of the present invention.

Referring to FIG. 1, the vehicle, designated by reference numeral 10, may include wheels 12FR, 12FL, 12RL and 12RR, which are rotated by a power source, a steering wheel 11, which serves to control the traveling direction of the vehicle 10, and a vehicular cradle assembly 100, which is capable of connecting with a mobile terminal.

The vehicular cradle assembly 100, capable of connecting with a mobile terminal, may be placed inside the vehicle 10. For example, the vehicular cradle assembly 100, capable of connecting with a mobile terminal, may be installed at an arbitrary location on a dashboard.

A mobile terminal 20 may be mounted on the mobile terminal connectable vehicular cradle assembly 100. The mobile terminal 20 may be electrically connected to the vehicle via a coupling port, which is included in the mobile terminal connectable vehicular cradle assembly 100. For example, the coupling port may be a Universal Serial Bus (USB) coupling port.

In the electrically connected state, the mobile terminal 20 and the vehicle 10 may exchange signals, information, or data. For example, at least one processor included in the vehicle 10 may provide the mobile terminal 20 with a signal for controlling the mobile terminal 20. For example, at least one processor included in the mobile terminal 20 may provide the vehicle 10 with a signal for controlling the vehicle 10.

When the mobile terminal 20 is connected to the vehicle 10, the vehicle 10 may transmit a signal to the mobile terminal 20 in order to check whether or not a vehicle application is installed in the mobile terminal 20. When connected to the vehicle 10 in the state in which the vehicle application is installed therein, the mobile terminal 20 may switch to a vehicle mode in response to a signal provided from the vehicle 10. Once the mobile terminal 20 has switched to the vehicle mode, only the vehicle application in the mobile terminal 20 may be operated. For example, the vehicle application may be a navigation application, a vehicle management application, a black box application, a climate-control application, an Audio Video (AV) application, or an odometer application.

In the case where the mobile terminal 20 is switched so as to be exclusively used for a vehicle, a user interface (UI) provided on the display of the mobile terminal 20 may be changed. The changed UI may be a dedicated vehicle UI.

Figure 2:
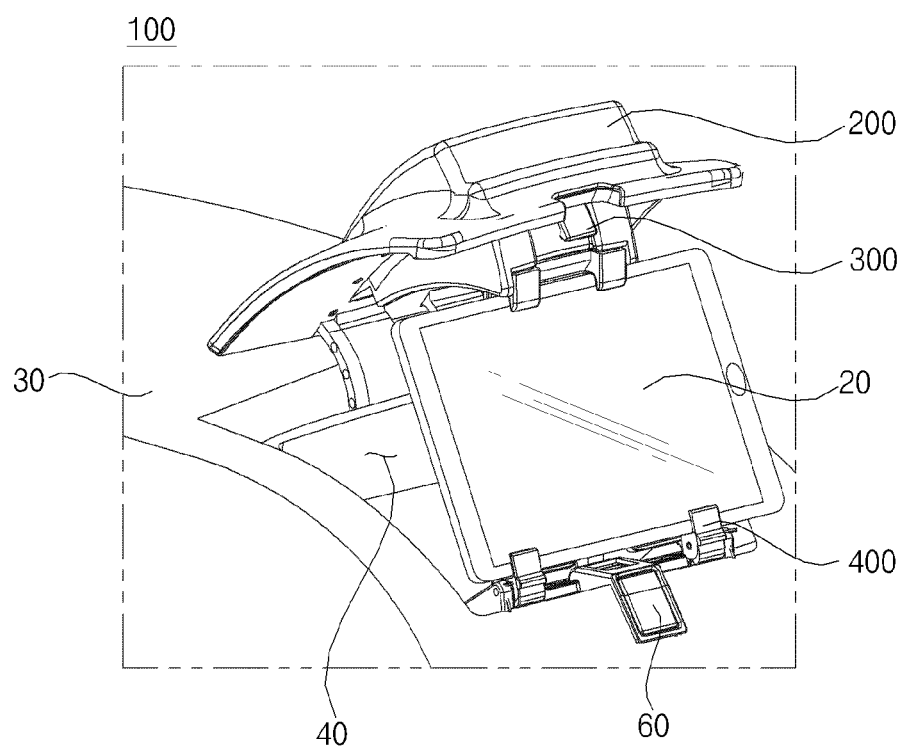
FIG. 2 is a view illustrating the external appearance of the vehicular cradle assembly capable of connecting with a mobile terminal in accordance with an embodiment of the present invention.

FIG. 2 is a view illustrating the external appearance of the mobile terminal connectable vehicular cradle assembly 100 in accordance with an embodiment of the present invention.

Figure 3:
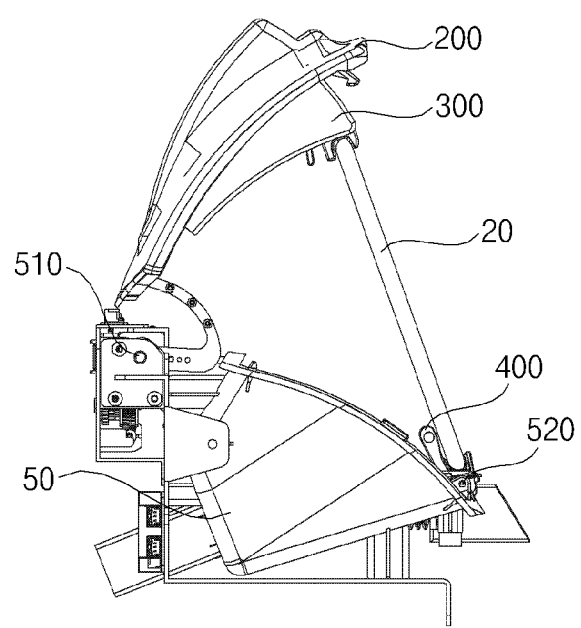
FIG. 3 is a side view of the vehicular cradle assembly capable of connecting with a mobile terminal in accordance with an embodiment of the present invention.

FIG. 3 is a side view of the mobile terminal connectable vehicular cradle assembly 100 in accordance with an embodiment of the present invention.

Referring to FIGS. 2 and 3, the mobile terminal connectable vehicular cradle assembly 100 in accordance with the embodiment of the present invention may include a cover unit 200, a binding unit 300, a support unit 400, a first pivot point 510, a second pivot point 520, and a locking unit 600.

The cradle assembly 100 may couple a mobile terminal with one or more computers of a vehicle.

The cover unit 200 is configured to open or close an accommodation space 40 defined inside a dashboard panel 30 by pivoting.

The cover unit 200 may pivot in the first direction so as to change to an open state. The cover unit 200 may pivot in the second direction so as to change to a closed state. For example, the first direction may be the upward direction, and the second direction may be the downward direction.

A user may cause the cover unit 200 to be opened using a button 60 that is located in a region on a dashboard.

In some embodiments, the mobile terminal connectable vehicular cradle assembly 100 may further include a drive device (e.g. a first step motor, which will be described below), which provides driving power to enable the automated opening and closing of the cover unit 200. For example, the drive device may be a motor or an actuator. The drive device may provide the cover unit 200 with driving power to enable the automated opening and closing of the cover unit 200 when the user operates the button 60.

When the mobile terminal 20 is sufficiently small, the mobile terminal 20 may be accommodated in the accommodation space 40. For example, when the mobile terminal 20 is a smart phone or a small tablet PC, the mobile terminal 20 may be accommodated in the accommodation space 40. In this case, when the user attempts to use the mobile terminal 20 while driving, the mobile terminal connectable vehicular cradle assembly 100 may support the mobile terminal 20 disposed thereon so as to assist the user in comfortably viewing the display of the mobile terminal 20. When the mobile terminal 20 is not used, the mobile terminal 20 may be accommodated in the accommodation space 40.

When the mobile terminal 20 is sufficiently large, the mobile terminal 20 may not be accommodated in the accommodation space 40. For example, when the mobile terminal 20 is a large tablet PC, the mobile terminal 20 may not be accommodated in the accommodation space 40. In this case, when the user attempts to use the mobile terminal 20 while driving, although the mobile terminal connectable vehicular cradle assembly 100 may support the mobile terminal 20 disposed thereon so as to assist the user in comfortably viewing the display of the mobile terminal 20, the mobile terminal 20 may not be accommodated in the accommodation space 40 when the mobile terminal 20 is not used.

The cover unit 200 may be formed of the same material as the exterior material of the dashboard panel 30, or a material similar thereto.

The accommodation space 40 may be sufficiently large to accommodate the mobile terminal 20 therein. As described above, in some embodiments, although the mobile terminal 20 may not be accommodated in the accommodation space 40, even in this case, the mobile terminal connectable vehicular cradle assembly 100 may support the mobile terminal 20 disposed thereon.

The accommodation space 40 may be utilized as a space in which articles other than the mobile terminal are stored.

In some embodiments, the accommodation space 40 may be defined by a cabinet 50. For example, the cabinet 50 may be located inside the dashboard. In this case, the first pivot point 510 may intermediate the coupling of the cover unit 200 and the cabinet 50. The first pivot point 510 may connect one end of the cover unit 200 to one end of the cabinet 50 so that the other end of the cover unit 200 is pivotable. The second pivot point 520 may intermediate the coupling of the support unit 400 and the cabinet 50. The second pivot point 520 may connect one end of the support unit 400 to the other end of the cabinet 50 so that the other end of the support unit 400 is pivotable.

Whether or not the cover unit 200 is pivotable may be determined based on whether or not the mobile terminal 200 is electrically connected to the vehicle 10.

The pivoting of the cover unit 200 may be limited by the operation of the locking unit 600. When the mobile terminal 20 is electrically connected to the vehicle 10, the locking unit 600 may limit the pivoting of the cover unit 200. At this time, the pivoting of the cover unit 200 may be limited when the locking unit 600 is operated.

In this case, the mobile terminal 20 may be an authenticated mobile terminal 20. For example, an application provided by the manufacturer of the vehicle 10 may be installed in the mobile terminal 20, and the vehicle 10 may authorize the mobile terminal 20 based on whether or not the application is installed. Alternatively, the vehicle 10 may authorize the mobile terminal 20 based on the PIN code of the mobile terminal 20.

The binding unit 300 may be attached to the lower end of the cover unit 200. The binding unit 300 may support the upper end of the mobile terminal 20. For example, the binding unit 300 may bind a first portion of the mobile terminal. The binding unit 300 may be movable between a first position and a second position. Here, the upper end and the lower end of the mobile terminal 20 may be determined on the basis of the ground surface. The portion of the body of the mobile terminal 200 that is distant from the ground surface may be defined as the upper end, and the portion that is close to the ground surface may be defined as the lower end.

The binding unit 300 may be movably formed. For example, a holder assembly 310 included in the binding unit 300 may be movable via a guide structure 320. For example, the binding unit 300 may be formed so as to be vertically movable.

The binding unit 300 will be described below in greater detail with reference to FIGS. 8 to 11.

The support unit 400 may support the mobile terminal 20 in the state in which the lower end of the mobile terminal 20 is seated therein. For example, the support unit 400 may support a second portion of the mobile terminal.

The support unit 400 may be fixed to the vehicle.

The support unit 400 will be described below in greater detail with reference to FIGS. 12 to 14.

The first pivot point 510 may be connected to one end of the cover unit 200. The first pivot point 510 may be the center about which the other end of the cover unit 200 pivots. For example, when the cover unit 200 pivots so as to be opened or closed, the other end of the cover unit 200 may pivot upward or downward on the basis of the first pivot point 510, which is connected to one end of the cover unit 200.

The first pivot point 510 may be located at the same height as the front upper end of the accommodation space 40. For example, the first pivot point 510 may intermediate the connection of the front portion of the cabinet 50 and the cover unit 200 so as to enable the pivoting of the cover unit 200. With this arrangement, the cover unit 200 may achieve an improved sense of unity with the dashboard panel 30 when it pivots so as to be closed. Here, the "front side" may be the direction in which a windshield glass is located, in front of the dashboard panel 30.

In some embodiments, the first pivot point 510 may be connected to a first step motor. The first step motor is driven by user input, thereby providing driving power required to pivot the cover unit 200.

The first pivot point 510 may provide the elastic force required to allow the other end of the cover unit 200 to elastically pivot in the first direction.

Figure 5:
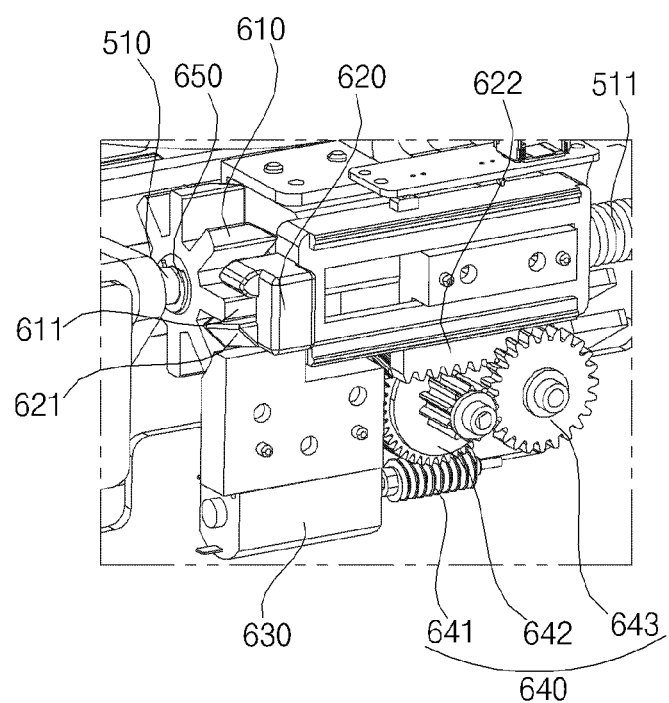
FIG. 5 is a view referenced to explain a locking unit in accordance with the embodiment of the present invention.

For example, the first pivot point 510 may be provided with an elastic body (511 in FIG. 5). The elastic body may apply rotational force to the first pivot point 510 in the first direction. In an exemplary embodiment of the present invention, there is no limitation as to variation and adjustment of the elastic force of the elastic body, and any known technology capable of adjusting, for example, the direction in which the elastic force is provided and the strength of the elastic force, may be adopted.

The second pivot point 520 may be connected to one end of the support unit 400. The second pivot point 520 may be the center about which the other end of the support unit 400 pivots. For example, when the support unit 400 pivots, the other end of the support unit 400 may pivot upward and downward on the basis of the second pivot point 520, which is connected to one end of the support unit 400.

The second pivot point 520 may be located at the rear side of the accommodation space 40. Here, the "rear side" may be the direction in which a driver's seat and a passenger seat are located on the basis of the dashboard panel 30. For example, the second pivot point 520 may intermediate the connection between the rear side of the cabinet 50 and the support unit 400 so as to enable the support unit 400 to pivot.

In some embodiments, the second pivot point 520 may be integrally formed with a seating recess in which the lower end of the mobile terminal 20 is seated. In this case, the seating portion included in the second pivot point 520 may serve as part of the support unit 400. When the seating recess is integrally formed in the second pivot point 520, the outer diameter of the second pivot point 520, viewed from the lateral side, may be sufficiently large to allow the mobile terminal 20 to be seated therein.

In some embodiments, the second pivot point 520 may be connected to a second step motor. The second step motor may be driven by user input, thereby providing driving power required to pivot the support unit 400.

The second pivot point 520 may provide the elastic force required to allow the other end of the support unit 400 to elastically pivot in a third direction.

For example, the second pivot point 520 may be provided with an elastic body. The elastic body may apply rotational force to the second pivot point 510 in a third direction. In an exemplary embodiment of the present invention, there is no limitation as to variation and adjustment of the elastic force of the elastic body, and any known technology capable of adjusting, for example, the direction in which the elastic force is provided and the strength of the elastic force, may be adopted.

As described above, when the mobile terminal 20, which has been supported on the mobile terminal connectable vehicular cradle assembly 100, is released due to the elastic force provided by the second pivot point 520, the mobile terminal 20 is slowly laid forward and downward, which may prevent damage to the mobile terminal 20.

The locking unit 600 may limit the pivoting of the cover unit 200. For example, when the mobile terminal 20 is electrically connected to the vehicle 10, the locking unit 600 may prevent the cover unit 200 from pivoting in the first direction.

The locking unit 600 may fix the binding unit at the second position based on a signal, from the one or more computers of the vehicle indication that the mobile terminal is electrically coupled with the one or more computers of the vehicle.

The locking unit 600 will be described below in greater detail with reference to FIGS. 4 to 6.

Figure 4:
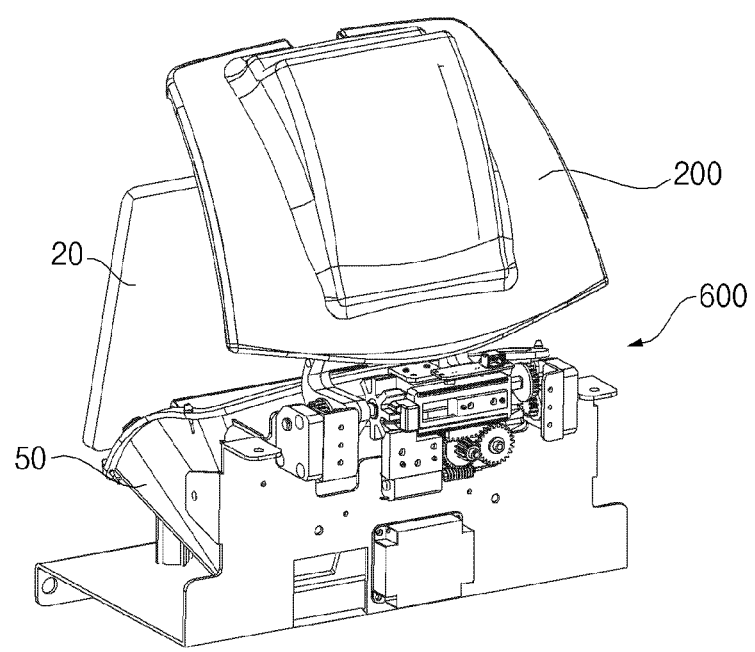
FIG. 4 is a rear perspective view of the vehicular cradle assembly capable of connecting with a mobile terminal in accordance with the embodiment of the present invention.

FIG. 4 is a rear perspective view of the mobile terminal connectable vehicular cradle assembly in accordance with the embodiment of the present invention.

FIG. 5 is a view referenced to explain the locking unit in accordance with the embodiment of the present invention.

Figure 6A:
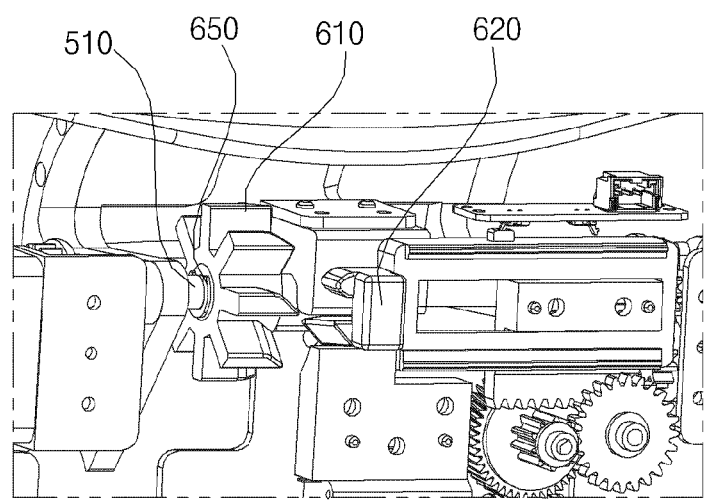
FIGS. 6A and 6B are views referenced to explain a locking operation in accordance with the embodiment of the present invention.
Figure 6B:
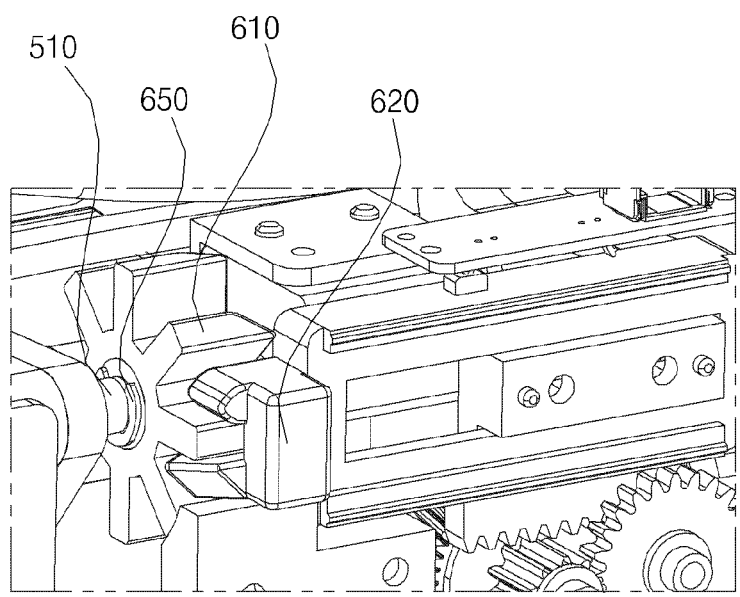

FIGS. 6A and 6B are views referenced to explain a locking operation in accordance with the embodiment of the present invention.

Referring to FIGS. 4 to 6, the locking unit 600 may serve to limit the pivoting of the cover unit 200 when the mobile terminal 20 is electrically connected to the vehicle 10.

The locking unit 600 may include a gear 610, a gear catch member 620, a drive unit 630, a power transmission mechanism 640, and a one-way clutch bearing 650.

The locking unit 600 may comprise a locking mechanism. The locking mechanism may fix the binding unit at the second position.

The locking mechanism may include a gear (610) and a gear catch piece (620).

The gear 610 may be connected to the binding unit 300. The gear 610 may be provided on the outer circumference thereof with a plurality of teeth, and the first pivot point 510 may penetrate the inner circumference of the gear 610. The gear 610 may be formed so as to transmit force in a given direction and to allow slippage in the opposite direction. To this end, the one-way clutch bearing 650 may be located between the gear 610 and the first pivot point 510.

For example, when one of the teeth 611 is caught by the gear catch member 620, the gear 610 may remain stationary rather than being rotated. As the gear 610 is fixed, the first pivot point 510 may also be fixed. In turn, the pivoting of the cover unit 200 in a given direction may be limited as the first pivot point 510 is fixed. In this case, the pivoting of the cover unit 200 may be limited in the first direction, but may not be limited in the second direction. Here, the "first direction" may be the direction in which the cover unit 200 pivots so as to be opened, and the "second direction" may be the direction in which the cover 200 pivots so as to be closed.

The gear catch member 620 may be configured so as to be caught by any one of the teeth 611 formed on the gear 610. The gear catch member 620 may have fingers 621 so that any one of the teeth 611 is caught by the fingers 621. The fingers 621 may be formed so as to fix any one of the teeth 611 from the top and bottom thereof. For example, the fingers 621 may be bent toward the gear 610.

The gear catch member 620 may be horizontally moved by moving power provided from the drive unit 630.

The gear catch member 620 may include a rack gear 622. The rack gear 622 may be configured so as to be engaged with the power transmission mechanism 640. The gear catch member 620 may receive, at the rack gear 622 thereof, the moving power provided from the drive unit 630. The gear catch member 620 may be horizontally moved by the moving power.

The drive unit 630 may provide the gear catch member 620 with the moving power. The drive unit 630 may be controlled by at least one processor included in the vehicle 10. For example, the processor may be a processor or an electronic control unit (ECU) of a display device included in the vehicle 10.

The drive unit 630 may operate the locking mechanism based on the signal, from the one or more computers of the vehicle, indicating that the mobile terminal is electrically coupled with the one or more computers of the vehicle.

The drive unit 630 may move the gear catch piece to hold at least one of the plurality of teeth based on the signal, by the one or more computers, indicating that the mobile terminal is electrically coupled with the one or more computers of the vehicle.

The processor included in the vehicle 10 may be implemented in hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units to perform other functions.

The drive unit 630 may include a electric motor or an electric actuator. The drive unit 630 may receive power from a battery included in the vehicle 10.

The drive unit 630 may receive an operation control signal from the processor included in the vehicle 10 when the mobile terminal 20 is electrically connected to the vehicle 10 and is authenticated.

For example, when the mobile terminal 20 is electrically connected to the vehicle 10, at least one processor included in the vehicle 10 may try to authenticate the mobile terminal 20. Here, the authentication may be implemented based on whether or not an application provided by the manufacturer of the vehicle 10 is installed in the mobile terminal 20. Alternatively, the authentication may be implemented using the PIN code of the mobile terminal 20. When the authentication is completed, the drive unit 630 may receive the operating control signal from the processor included in the vehicle 10. For example, the processor may be a processor of the display device for the vehicle.

When the authentication of the mobile terminal 20 is completed in the state in which the mobile terminal 20 and the vehicle 10 are electrically connected to each other, the drive unit 630 may provide moving power. In this case, the moving power may be provided to the gear catch member 620 through the power transmission mechanism 640. The gear catch member 620 may be horizontally moved to catch any one of the teeth 611 of the gear 610. In this case, the cover unit 200 may be fixed. Because the cover unit 20 is fixed, the mobile terminal 20 may be supported by the mobile terminal connectable vehicular cradle assembly 100. Meanwhile, although the pivoting of the cover unit 200 is limited in the first direction in the state in which the cover unit 200 is fixed, the cover unit 200 may pivot in the second direction. The one-way clutch bearing 650 may serve to prevent the pivoting of the cover unit 200 in a given direction.

The power transmission mechanism 640 may transmit the moving power provided from the drive unit 630 to the gear catch member 620.

The power transmission mechanism 640 may be comprised of a plurality of gears. For example, the power transmission mechanism 640 may be comprised of a worm gear 641, a first feed gear 642, and a second feed gear 643.

The worm gear 641 may be connected to the drive unit 630. Teeth of the worm gear 641 may be engaged with the first feed gear 642. The first feed gear 642 may receive driving power from the worm gear 641. Teeth of the first feed gear 642 may be engaged with the second feed gear 643. The second feed gear 643 may receive driving power from the first feed gear 642. Teeth of the second feed gear 643 may be engaged with the rack gear 622 of the gear catch member 620. The gear catch member 620 may receive the moving power through the power transmission mechanism 640.

The one-way clutch bearing 650 may be located between the gear 610 and the first pivot point 510. The one-way clutch bearing 650 causes the gear 610 to transmit power in a given direction while preventing the gear 610 from transmitting power in the opposite direction. For example, when the gear 610 is caught by the gear catch member 620, the one-way clutch bearing 650 may prevent the cover unit 200 from pivoting in the first direction and allow the cover unit 200 to pivot in the second direction.

As exemplarily illustrated in FIG. 6A, when the gear 610 is not caught by the gear catch member 620, the other end of the cover unit 200 may pivot upward or downward. For example, the user may push the button (60 in FIG. 2) provided inside the vehicle so as to change the cover unit 200 to the open state. For example, the user may change the cover unit 200 to the closed state by pushing the upper end of the cover unit 200. In some embodiments, the change to the open state or the closed state of the cover unit 200 may be automatically implemented.

As exemplarily illustrated in FIG. 6B, when the gear 610 is caught by the gear catch member 620, the other end of the cover unit 200 may pivot downward, but may not pivot upward.

Figure 7A:
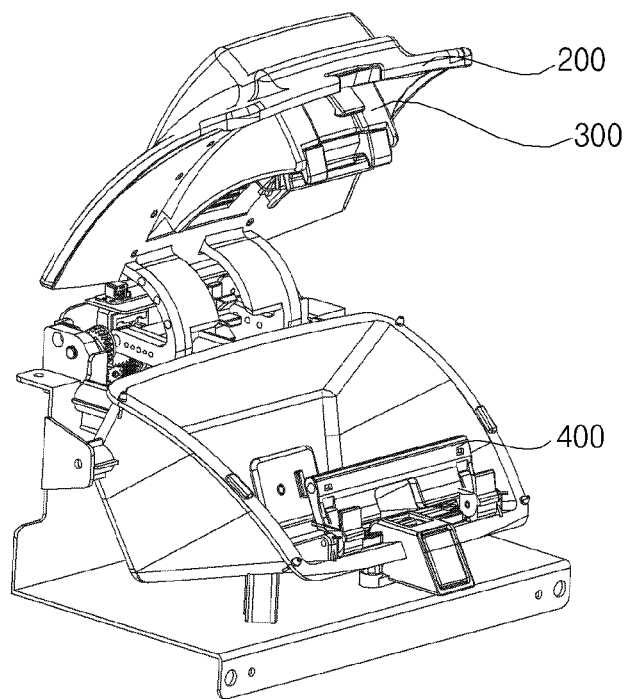
FIGS. 7A to 7C are views referenced to explain the procedure of mounting a mobile terminal on the mobile terminal connectable vehicular cradle assembly in accordance with the embodiment of the present invention.
Figure 7B:
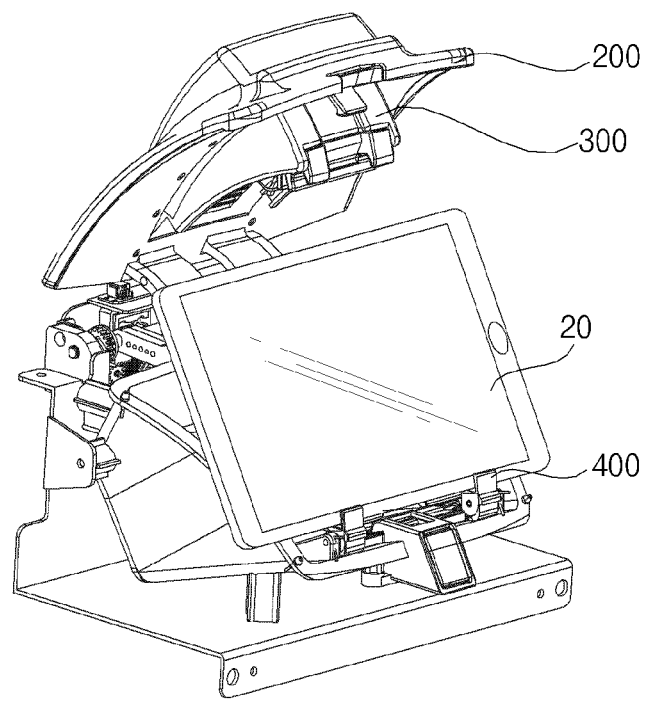
Figure 7C:
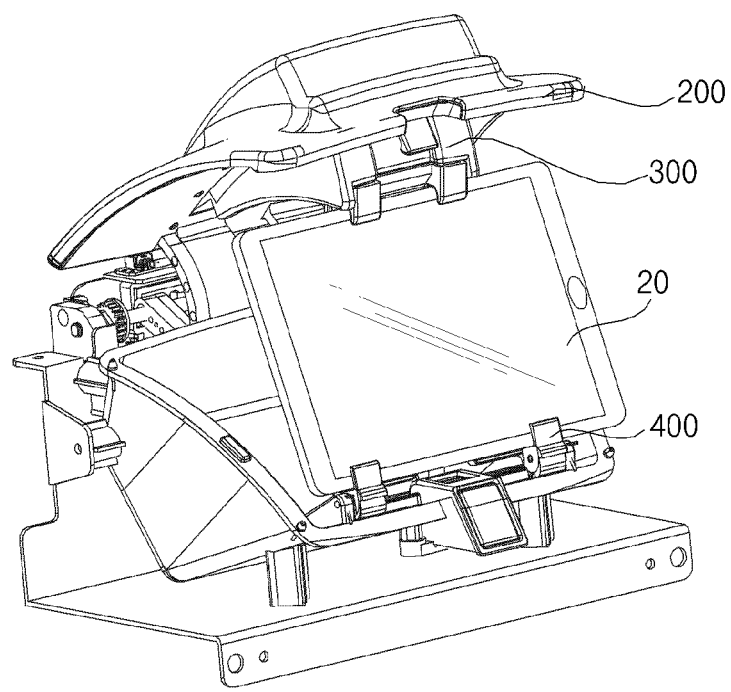

FIGS. 7A to 7C are views referenced to explain the mobile terminal connectable vehicular cradle assembly, configured to support the mobile terminal disposed thereon, in accordance with the embodiment of the present invention.

As exemplarily illustrated in FIG. 7A, the cover unit 200 may change to the open state through an operation of pushing the button (60 in FIG. 2). In this case, the cover unit 200 may receive elastic force from the first pivot point 510, thereby elastically pivoting in the first direction.

As exemplarily illustrated in FIG. 7B, when the cover unit 20 is in an open state, the lower end of the mobile terminal 20 may be seated in and supported by the support unit 400.

When the authentication of the mobile terminal 20 is completed in the state in which the mobile terminal 20 and the vehicle 10 are electrically connected to each other, the gear 610 may be caught by the gear catch member 620.

In this case, as exemplarily illustrated in FIG. 7C, in the state in which the mobile terminal 20 is supported at the lower end thereof by the support unit 400, the cover unit 200 pivots downward, causing the binding unit 300 to fix the upper end of the mobile terminal 20. At this time, because the cover unit 200 cannot pivot upward, the mobile terminal 20 may be disposed on and fixed to the mobile terminal connectable vehicular cradle assembly 100.

Meanwhile, the mobile terminal 20 may switch to a vehicle mode when electrically connected to the vehicle 10. In the vehicle mode, the mobile terminal 20 may limit the operation of applications other than a vehicle application.

As described above, by allowing the mobile terminal 20 to be supported by the mobile terminal connectable vehicular cradle assembly 100 only in the state in which the mobile terminal 20 is electrically connected to the vehicle 10 and is authenticated, the mobile terminal 20 may be permitted to be mounted in the vehicle only when switched to the vehicle mode, which may contribute to safe driving.

In addition, because the cover unit 200 covers the mobile terminal 20 once the mobile terminal 20 has been mounted, it is possible to prevent the display of the mobile terminal 20 from becoming hazy due to light introduced from the outside.

Figure 8:
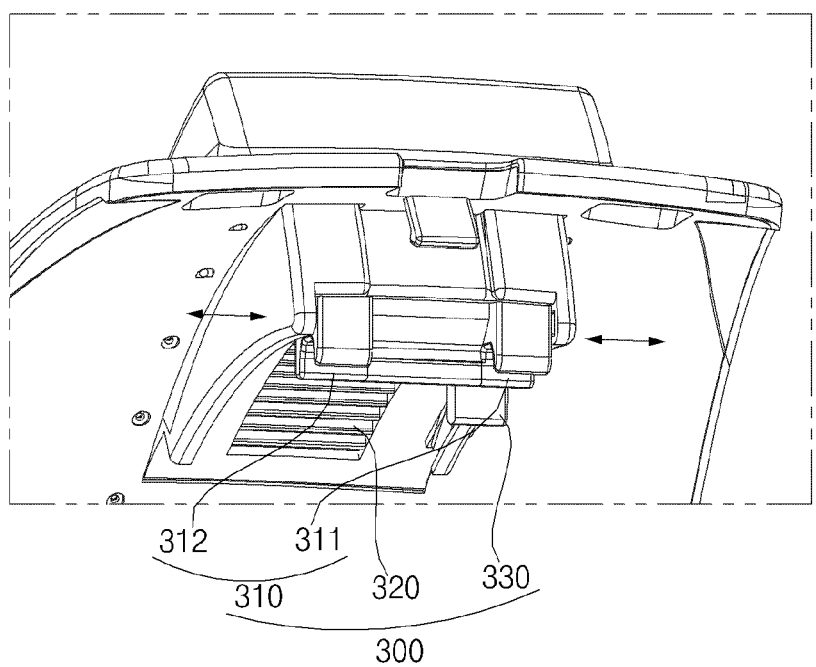
FIG. 8 is a view schematically illustrating a binding unitbinding unit in accordance with the embodiment of the present invention.

FIG. 8 is a view schematically illustrating the binding unit in accordance with the embodiment of the present invention.

Figure 9:
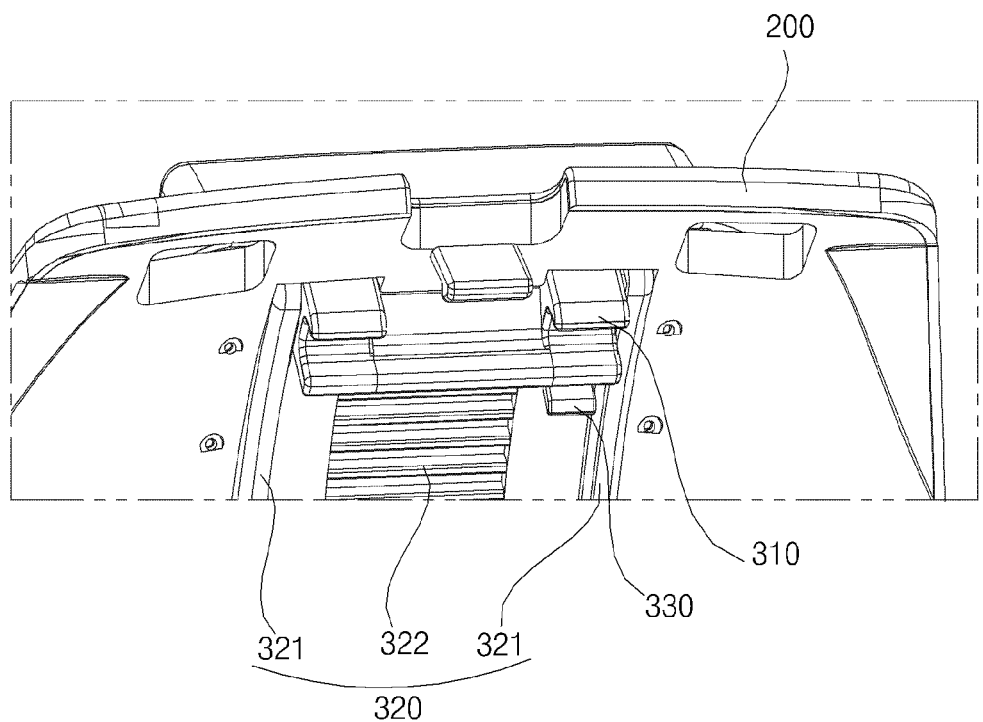
FIG. 9 is a view illustrating the first state of the binding unitbinding unit in accordance with the embodiment of the present invention.
Figure 10:
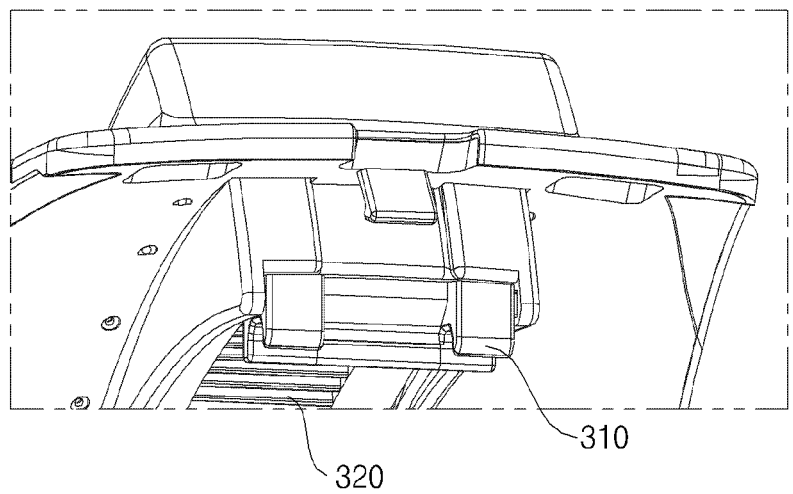
FIG. 10 is a view illustrating the second state of the binding unit in accordance with the embodiment of the present invention.

FIG. 9 is a view illustrating the first state of the binding unit in accordance with the embodiment of the present invention, and FIG. 10 is a view illustrating the second state of the binding unit in accordance with the embodiment of the present invention.

Figure 11:
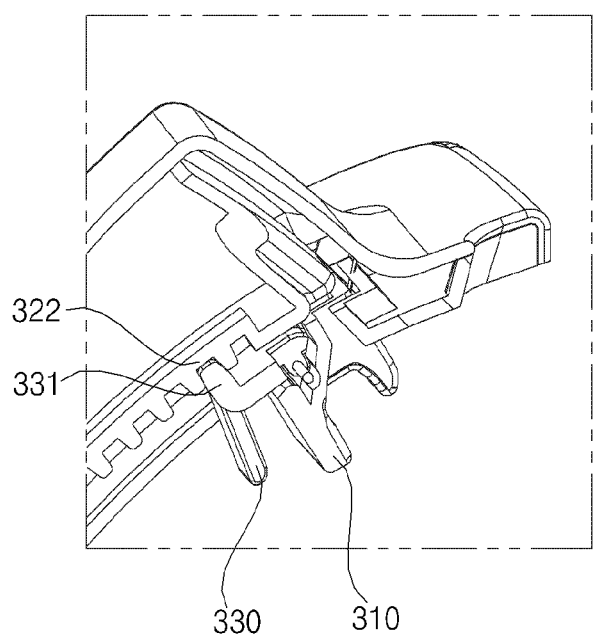
FIG. 11 is a side view of the binding unit in accordance with the embodiment of the present invention.

FIG. 11 is a side view illustrating the binding unit in accordance with the embodiment of the present invention.

Referring to FIGS. 8 to 11, the binding unit 300 may be affixed to the lower end of the cover unit 200. The binding unit 300 may fix the upper end of the mobile terminal 20.

The binding unit 300 may include the holder assembly 310, the guide structure 320, and a fixing lever 330.

The holder assembly 310 may be movably formed, and may fix the upper end of the mobile terminal 20. The holder assembly 310 may be movable on the guide structure 320. The holder assembly may be adjustable. For example, the holder assembly 310 may move on the guide structure 320, which is inclined upward and rearward when the cover unit 200 is in an open state. For example, the holder assembly 310 may move on the guide structure 320, which is inclined downward and forward when the cover unit 200 is in an open state.

The angle at which the mobile terminal 20 is placed may be determined through the movement of the holder assembly 310. The user may appropriately determine the angle of the mobile terminal 20 in consideration of the direction of the user's eyes, which depends on the user's height when seated.

The holder assembly 310 may include a single holder or a plurality of holders. For example, the holder assembly 310 includes one or more holders and each of the one or more holders binds a different portion of the mobile terminal.

The one or more holders may be movable to bind different portions of the mobile device based on one or more characteristics of the mobile terminal.

The one or more characteristics of the mobile terminal may include a size of the mobile terminal, a thickness of the mobile terminal, or a weight of the mobile terminal.

For example, the holder assembly 310 may include a first holder 311 and a second holder 312. The first holder 311 may fix a first location on the upper end of the mobile terminal 20. The second holder 312 may fix a second location on the upper end of the mobile terminal 20.

The first holder 311 and the second holder 312 may be formed so as to be horizontally movable.

Each of the first holder 311 and the second holder 312 may be formed so as to be horizontally movable based on the size of the mobile terminal 20. For example, when the mobile terminal 20 is a smart phone and thus has a relatively small size, the first holder 311 and the second holder 312 may be horizontally moved so as to be closer to each other. For example, when the mobile terminal 20 is vertically supported, the first holder 311 and the second holder 312 may be horizontally moved so as to be closer to each other. For example, when the mobile terminal 20 is a large tablet PC and thus has a relatively large size, the first holder 311 and the second holder 312 may be horizontally moved far away from each other. For example, when the mobile terminal 20 is horizontally supported, the first holder 311 and the second holder 312 may be horizontally moved far away from each other.

As described above, because the first holder 311 and the second holder 312 are horizontally movably formed, it is possible to mount the mobile terminal having any of various sizes in the vehicle, or to mount the mobile terminal 20 in either a portrait or landscape orientation.

A friction member may be affixed inside each of the first holder 311 and the second holder 312. Here, the friction member may be formed of rubber. With the friction member affixed inside each of the first holder 311 and the second holder 312, the mobile terminal 20 may be more firmly supported. In addition, it is possible to support the mobile terminal 20 having any of various sizes.

The guide structure 320 may guide the movement of the holder assembly 310. The guide structure 320 may include guide rails 321 and a plurality of grooves 322. The guide rails 321 may guide the movement of the holder assembly 310. A protrusion 331 of the fixing lever 330 may be inserted into any one of the grooves 322. In this case, the holder assembly 310 may be fixed.

The guide structure 320 may guide the holder assembly 310 so that the holder assembly 310 is moved along the rearwardly and upwardly inclined path or along the forwardly and downwardly inclined path when the cover unit 200 is in an open state.

The fixing lever 330 may fix the holder assembly 310 at one location on the guide structure 320.

The fixing lever 330 may include the protrusion 331. The protrusion 331 may be inserted into any one of the grooves 322 of the guide structure 320. In this case, the holder assembly 310 may be fixed.

The holder assembly 310, as exemplarily illustrated in FIG. 9, may be in the first state. Here, by way of example, the "first state" may mean the state in which the holder assembly 310 comes into close contact with the cover unit 200.

The holder assembly 310, as exemplarily illustrated in FIG. 10, may be in the second state. Here, by way of example, the "second state" may mean the state in which the holder assembly 310 is spaced apart from the cover unit 200. The holder assembly 310 may protrude downward from the cover unit 200 when the cover unit 200 is in an open state.

The height of the cover unit 200 may be determined based on whether the holder assembly 310 is in the first state or in the second state when the mobile terminal 20 is supported.

The visibility of the mobile terminal 20 may be increased by adjusting the height of the cover unit 200 based on the incident angle of solar light.

Figure 12:
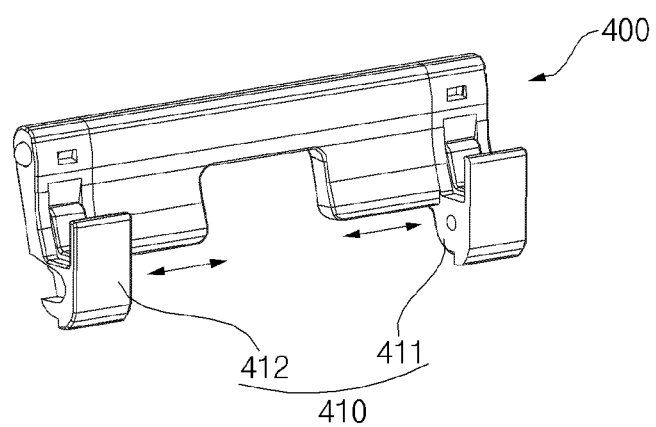
FIG. 12 is a view illustrating a support unit in accordance with the embodiment of the present invention.

FIG. 12 is a view illustrating the support unit in accordance with the embodiment of the present invention.

Figure 13:
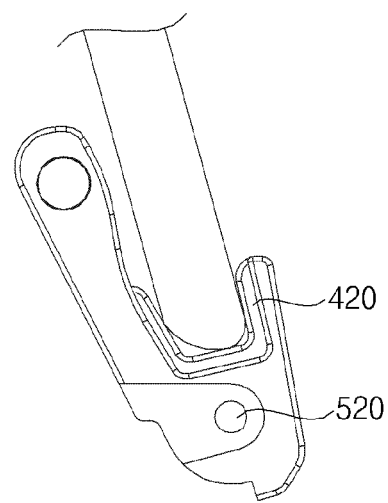
FIG. 13 is a side view of the support unit in accordance with the embodiment of the present invention.

FIG. 13 is a side view of the support unit in accordance with the embodiment of the present invention.

Figure 14:
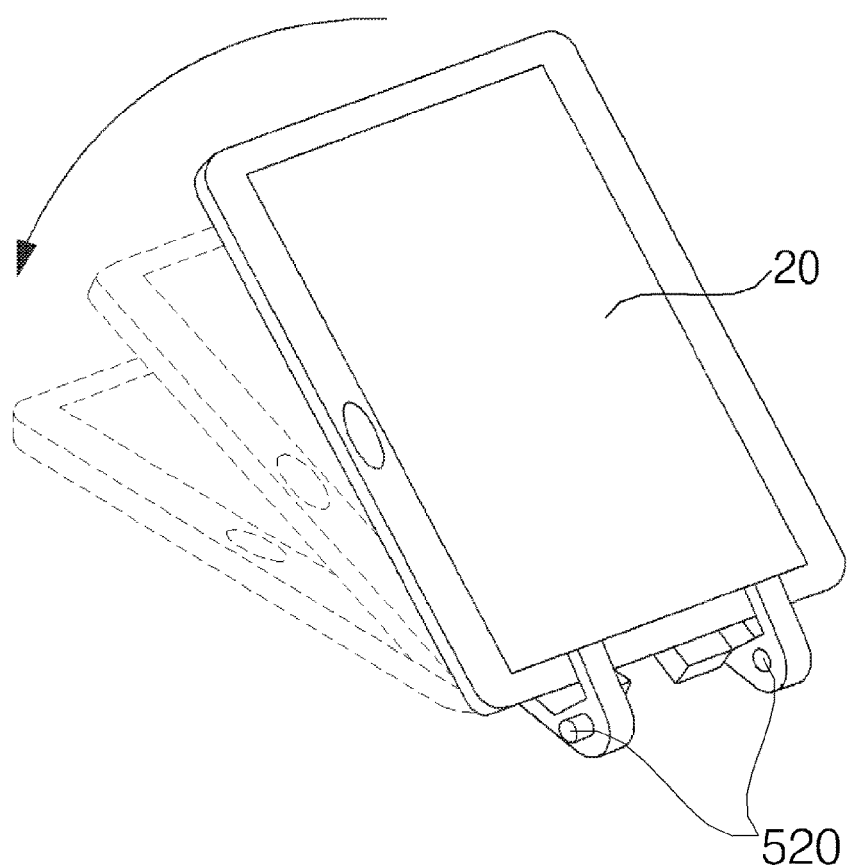
FIG. 14 is a view referenced to explain pivoting elastic force provided by a second pivot point unit in accordance with the embodiment of the present invention.

FIG. 14 is a view referenced to explain pivoting elastic force provided by the second pivot point in accordance with the embodiment of the present invention.

Referring to FIGS. 12 to 14, the support unit 400 may support the mobile terminal 20 when the lower end of the mobile terminal 20 is seated therein.

The support unit 400 may include a single holder or a plurality of holders. For example, the support unit may include one or more holders and each of the one or more holders binds a different portion of the mobile terminal.

The one or more holders are movable to bind different portions of the mobile terminal based on one or more characteristics of the mobile terminal.

For example, the support unit 400 may include a third holder 411 and a fourth holder 412.

When a first point on the lower end of the mobile terminal 20 is seated thereon, the third holder 411 may support the first point. When a second point on the lower end of the mobile terminal 20 is seated thereon, the fourth holder 412 may support the second point.

The third holder 411 and the fourth holder 412 may be formed so as to be horizontally movable.

Each of the third holder 411 and the fourth holder 412 may be horizontally movably formed based on the size of the mobile terminal 20. For example, when the mobile terminal 20 is a smart phone and thus has a relatively small size, the third holder 411 and the fourth holder 412 may be horizontally moved so as to be closer to each other. For example, when the mobile terminal 20 is vertically supported, the third holder 411 and the fourth holder 412 may be horizontally moved so as to be closer to each other. For example, when the mobile terminal 20 is a large tablet PC and thus has a relatively large size, the third holder 411 and the fourth holder 412 may be horizontally moved far away from each other. For example, when the mobile terminal 20 is horizontally supported, the third holder 411 and the fourth holder 412 may be horizontally moved far away from each other.

As described above, because the third holder 411 and the fourth holder 412 are horizontally movably formed, it is possible to mount the mobile terminal 20 having any of various sizes in the vehicle.

A friction may be affixed inside each of the third holder 411 and the fourth holder 412. Here, the friction member may be formed of rubber. With the friction member affixed inside each of the third holder 411 and the fourth holder 412, the mobile terminal 20 may be more firmly supported. In addition, it is possible to support the mobile terminal 20 having any of various sizes.

Meanwhile, as described above, the second pivot point 520 may provide the elastic force required to cause the other end of the support unit 400 to elastically pivot in a given direction. In this way, as exemplarily illustrated in FIG. 14, when the cover unit 200 changes to the open state in the state in which the mobile terminal 20 is supported by the support unit 400, the second pivot point 520 may cause the mobile terminal 20 to slowly pivot, which may prevent damage to the mobile terminal 20.

The support unit 400 may be operative to pivot about an axis of the pivot point 520.

The pivot point may include a pivot shaft and a pivot hole, the pivot shaft pivoting by elastic force.

The support unit 400 may be hidden in the accommodation space 40 when the cover unit 200 is closed in the state in which the mobile terminal 20 is not seated therein.

Figure 15:
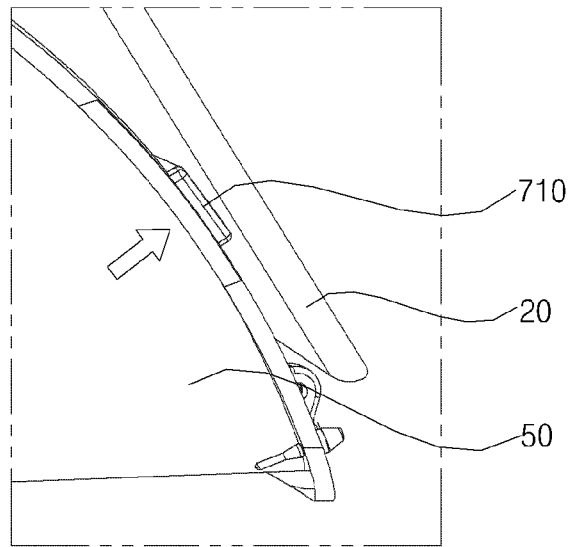
FIG. 15 is a view referenced to explain a stopper in accordance with the embodiment of the present invention.

FIG. 15 is a view referenced to explain a stopper in accordance with the embodiment of the present invention.

Referring to FIG. 15, the mobile terminal connectable vehicular cradle assembly 100 may further include a stopper 710. The stopper 710 may alleviate shocks that are applied to the mobile terminal 20 when the cover unit 200 changes to the open state so as to enable the pivoting of the mobile terminal 20 in the state in which the mobile terminal 20 is supported. The stopper 710 may be formed on a region of the cabinet 50. The stopper 710 may be located at a position at which it is expected that collision shocks with the mobile terminal 20 will occur when the cover unit 200 changes to the open state.

For example, the stopper 710 may be formed on the inner bottom surface of the cabinet 50. When the mobile terminal 20 is small enough to be accommodated in the accommodation space 40, the stopper 710 formed on the inner bottom surface of the cabinet 50 may alleviate shocks applied to the mobile terminal 20.

For example, the stopper 710 may be formed at the highest portion of the cabinet 50 that faces the mobile terminal 20. As such, even when the mobile terminal 20 is too large to be accommodated in the accommodation space 40, the stopper 710 may act to alleviate shocks applied to the mobile terminal 20.

Figure 16:
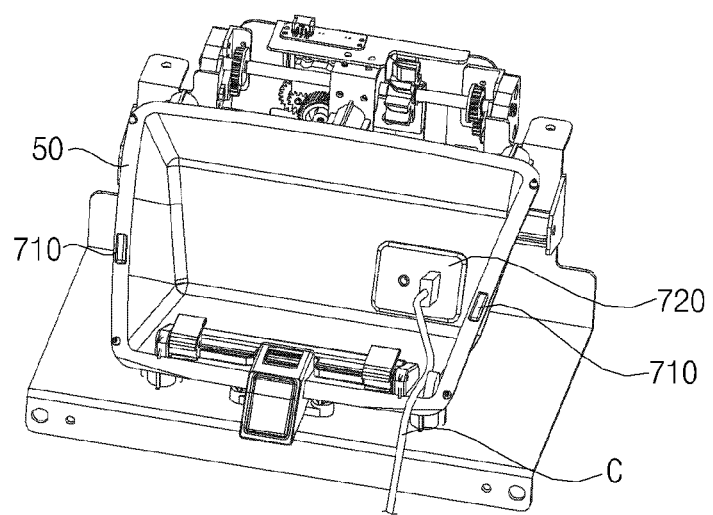
FIG. 16 is a view referenced to explain a coupling port in accordance with the embodiment of the present invention.

FIG. 16 is a view referenced to explain a coupling port in accordance with the embodiment of the present invention.

Referring to FIG. 16, the mobile terminal connectable vehicular cradle assembly 100 may further include a coupling port 720. The coupling port 720 may be formed on a region of the cabinet 50, which defines the accommodation space 40. One end of a connection cable C, which connects the vehicle 10 and the mobile terminal 20 to each other, may be inserted into the coupling port 720. Various mobile terminals may be connected to the vehicle 10 according to the shape of the other end of the connection cable C.

When the mobile terminal 20 is electrically connected to the coupling port 720 via the connection cable C, the mobile terminal 20 may receive electricity from a battery of the vehicle 10. In this case, the mobile terminal 20 may be charged.

Figure 17:
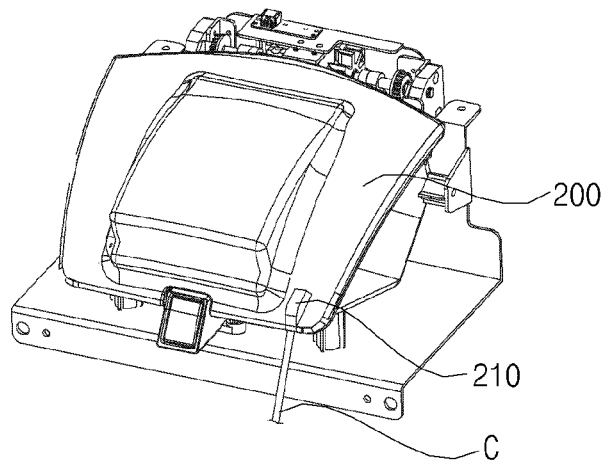
FIGS. 17 and 18 are views referenced to explain a hole formed in a cover unit and a hole cover in accordance with the embodiment of the present invention.
Figure 18:
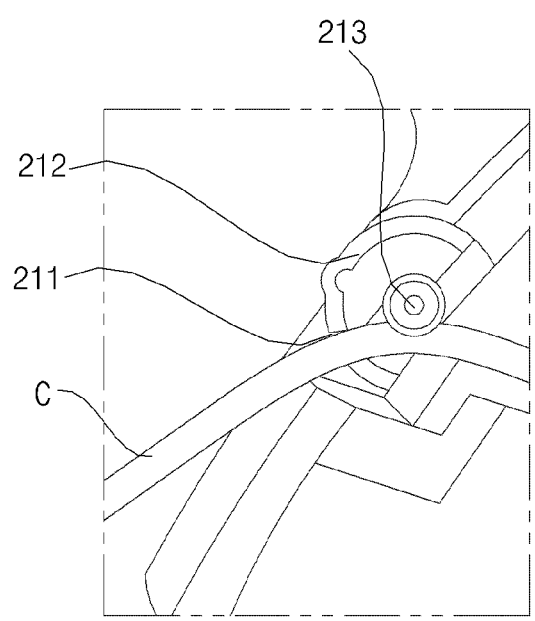

FIGS. 17 and 18 are views referenced to explain a hole formed in the cover unit and a hole cover in accordance with the embodiment of the present invention.

Referring to FIGS. 17 and 18, the cover unit 200 may include a hole 211, a hole cover 212, and a third pivot point 213.

The connection cable C may penetrate the hole 211 when the vehicle 10 and the mobile terminal 20 are connected to each other via the connection cable C. For example, one end of the connection cable C may be connected to the coupling port 720 and the other end of the connection cable C may be connected to the mobile terminal 20. The mobile terminal 20 may be located in the space inside the vehicle, rather than being accommodated the accommodation space 40. In this case, the connection cable C may penetrate the hole 211. Accordingly, even when the cover unit 200 is in a closed state, the connection cable C may penetrate the hole 211 so that one end of the connection cable C is connected to the coupling port 720 and the other end of the connection cable C is connected to the mobile terminal 20.

When the mobile terminal 20 does not assist driving, but is merely connected to the vehicle 10 for charging, no damage to the connection cable C occurs. In this case, the mobile terminal 20 may not be the driver's mobile terminal, but may be the passenger's mobile terminal.

The hole cover 212 may cover the hole 211. In the state in which the connection cable C does not penetrate the hole 211, the hole 211 may be covered with the hole cover 212. The hole cover 212 may pivot about the third pivot point 212 so as to cover the hole 211.

Figure 19:
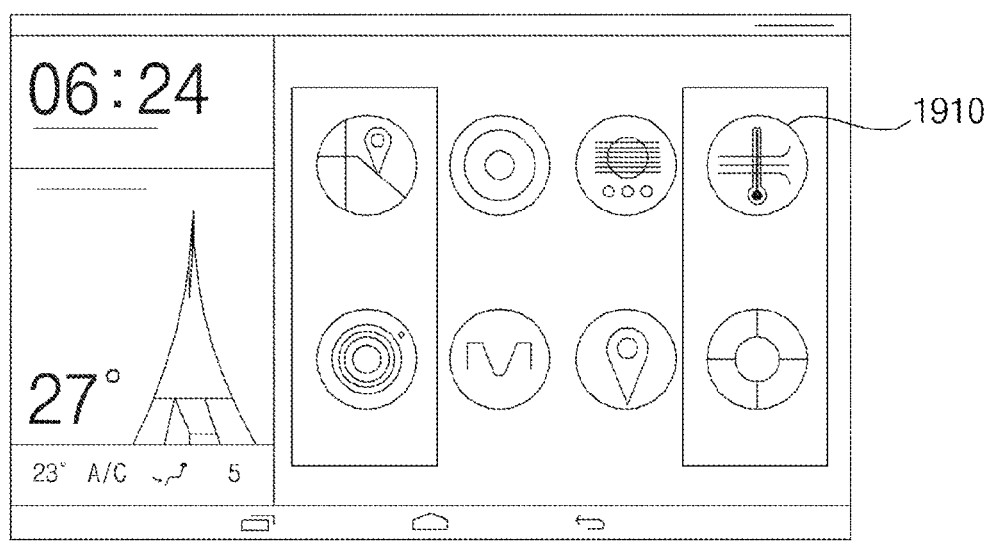
FIGS. 19 and 20 are views referenced to explain a vehicle mode of the mobile terminal in accordance with the embodiment of the present invention.
Figure 20:
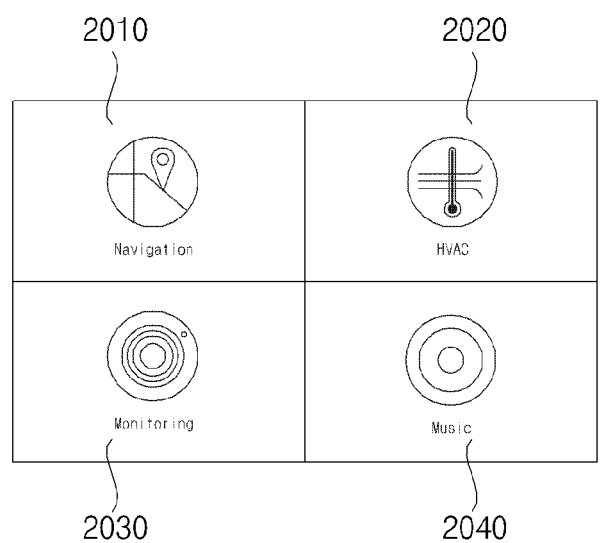

FIGS. 19 and 20 are views referenced to explain a vehicle mode of the mobile terminal in accordance with the embodiment of the present invention.

Referring to FIGS. 19 and 20, when the vehicle 10 authenticates the mobile terminal 20 connected thereto, the mobile terminal 20 may switch to a vehicle mode in response to a control instruction from the vehicle 10. In this case, only an application for the vehicle 10 may be driven among various applications installed in the mobile terminal 20.

The mobile terminal 20 may control the vehicle 10 when the application is executed. For example, when receiving user input to control air conditioning in the state in which a vehicle air conditioning application 1910 is running, the vehicle 10 may control air conditioning in response to the user input.

Meanwhile, when switched to the vehicle mode, the mobile terminal 20 may display application icons that are different from those displayed in a normal mode. For example, the mobile terminal 20 may display larger icons in the vehicle mode than in the normal mode. These icons may have a circular or polygonal shape.

Meanwhile, in some embodiments, the display of the mobile terminal 20 may be divided into a plurality of areas 2010, 2020, 2030 and 2040 in order to receive user input to drive applications. Because the applications that may be executed in the vehicle mode are limited, the mobile terminal 20 may divide the display into areas that suit the applications, and may match the areas to respective vehicle applications. In this case, the range within which user touch input for controlling a vehicle application may be received may be increased. Thereby, the user may easily drive the vehicle application without paying attention while driving.

Figure 21:
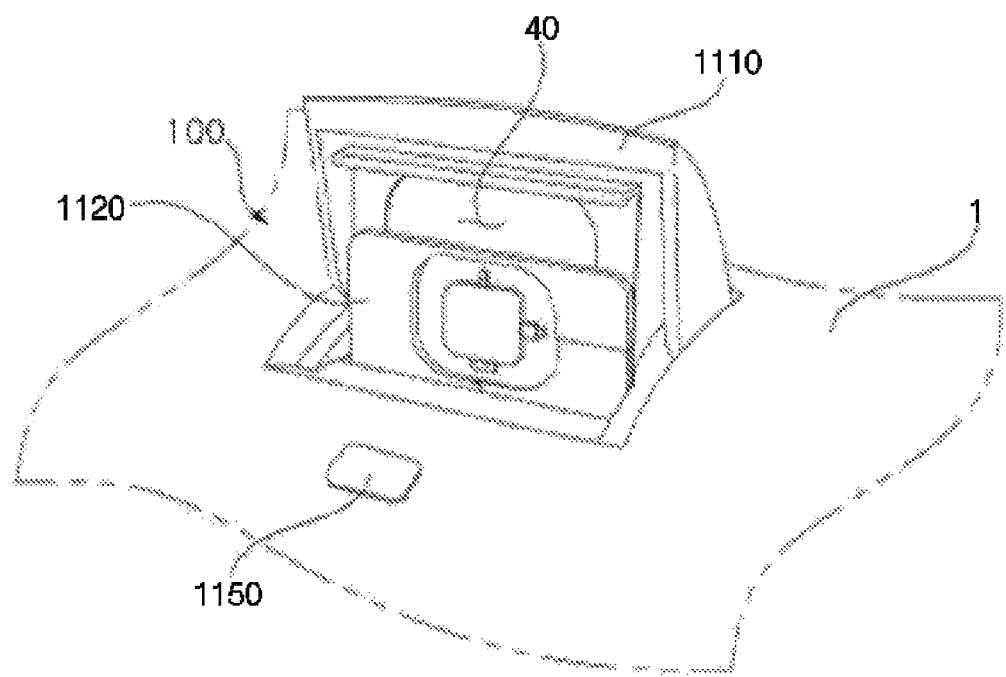
FIG. 21 is a perspective view illustrating the external appearance of the mobile terminal connectable vehicular cradle assembly during a pop-up operation in accordance with an exemplary embodiment of the present invention.

FIG. 21 is a perspective view illustrating the external appearance of the mobile terminal connectable vehicular cradle assembly during a pop-up operation in accordance with an exemplary embodiment of the present invention.

Figure 22:
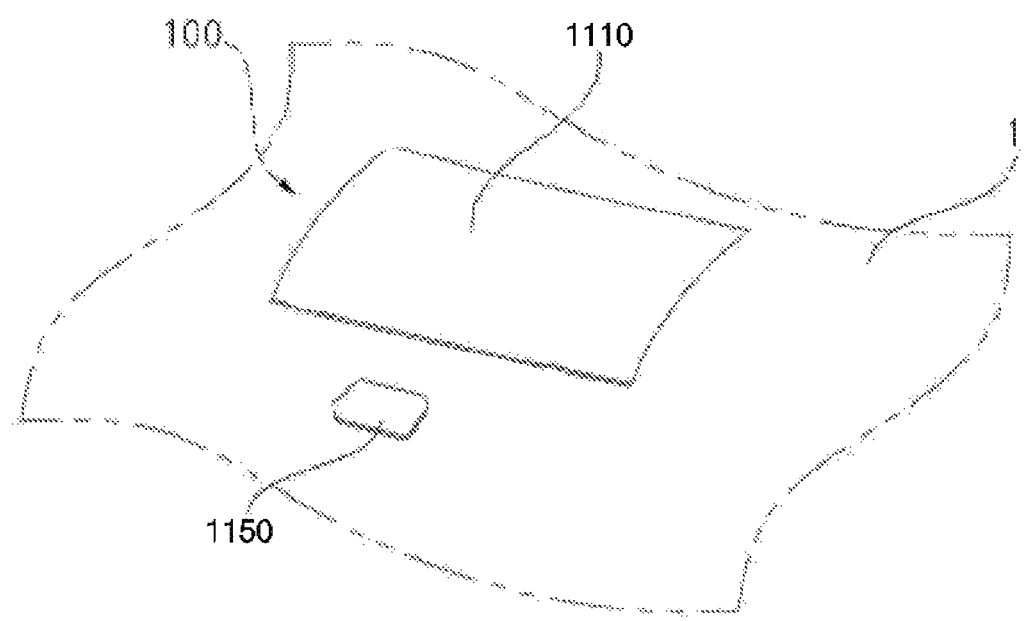
FIG. 22 is a perspective view illustrating the external appearance of the mobile terminal connectable vehicular cradle assembly when closed in accordance with an exemplary embodiment of the present invention.

FIG. 22 is a perspective view illustrating the external appearance of the mobile terminal connectable vehicular cradle assembly when closed in accordance with an exemplary embodiment of the present invention.

Figure 23A:
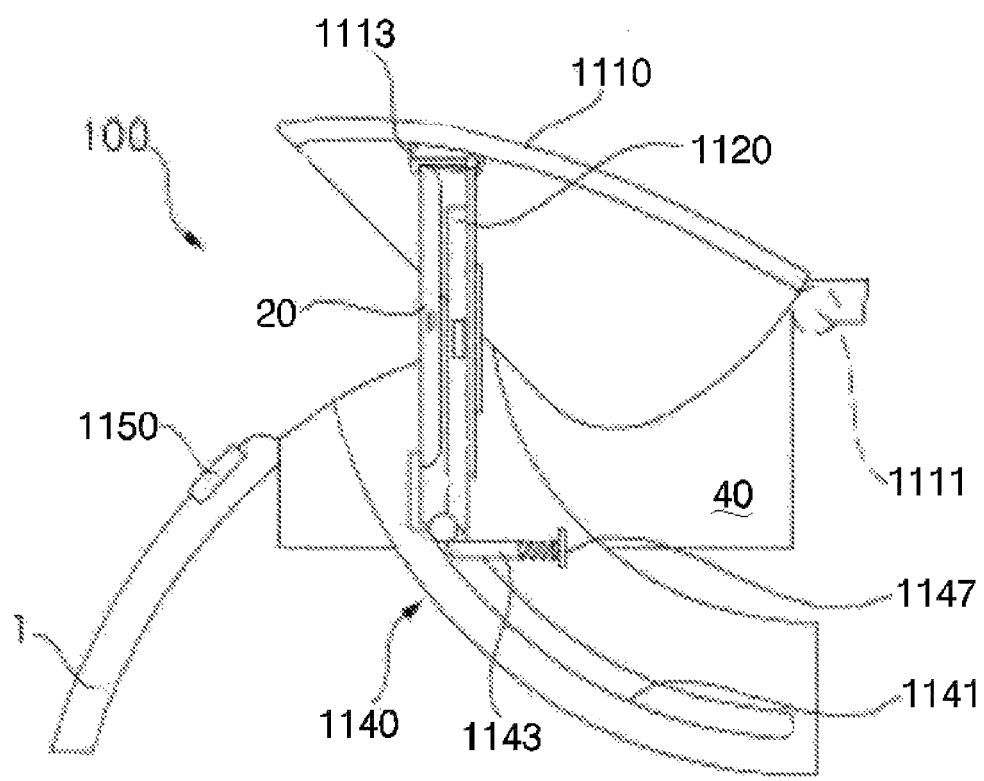
FIGS. 23A and 23B are sectional views illustrating the mobile terminal connectable vehicular cradle assembly in accordance with the present invention during the pop-up operation and when closed, referenced via FIGS. 21 and 22.
Figure 23B:
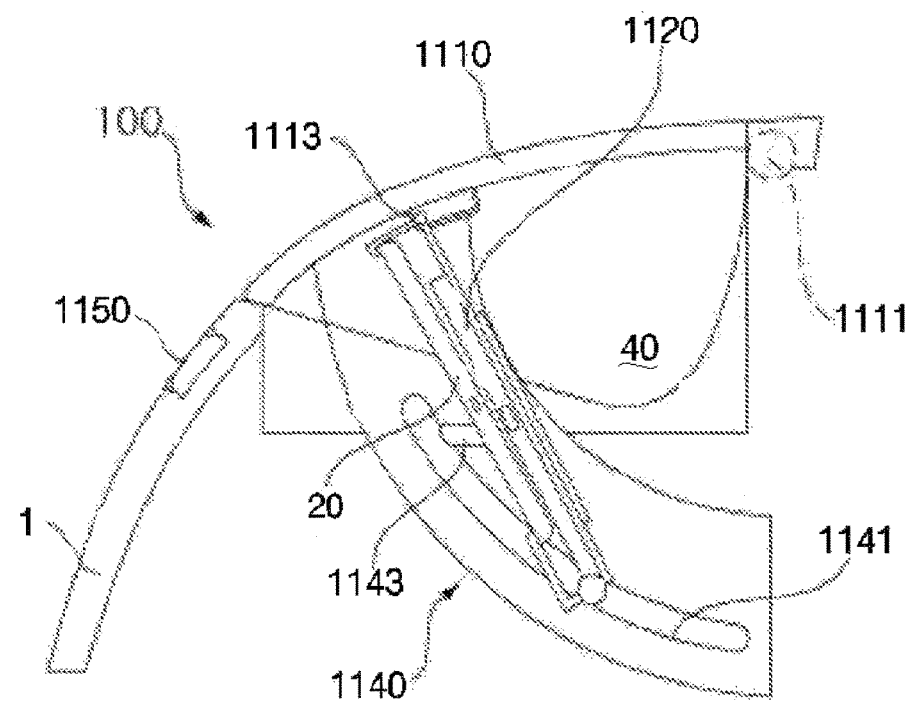

FIGS. 23A and 23B are sectional views illustrating the mobile terminal connectable vehicular cradle assembly in accordance with the present invention during the pop-up operation and when closed, referenced via FIGS. 21 and 22.

Figure 24:
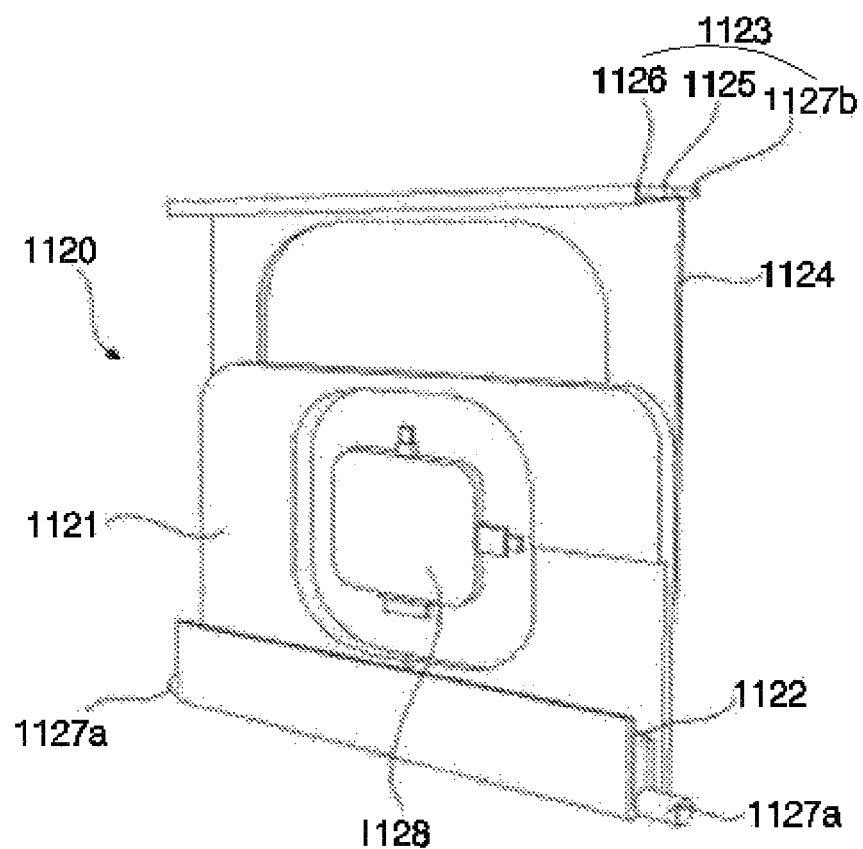
FIG. 24 is a perspective view illustrating a mobile terminal attachment unit of FIG. 21.

FIG. 24 is a perspective view illustrating a mobile terminal attachment unit of FIG. 21.

Figure 25A:
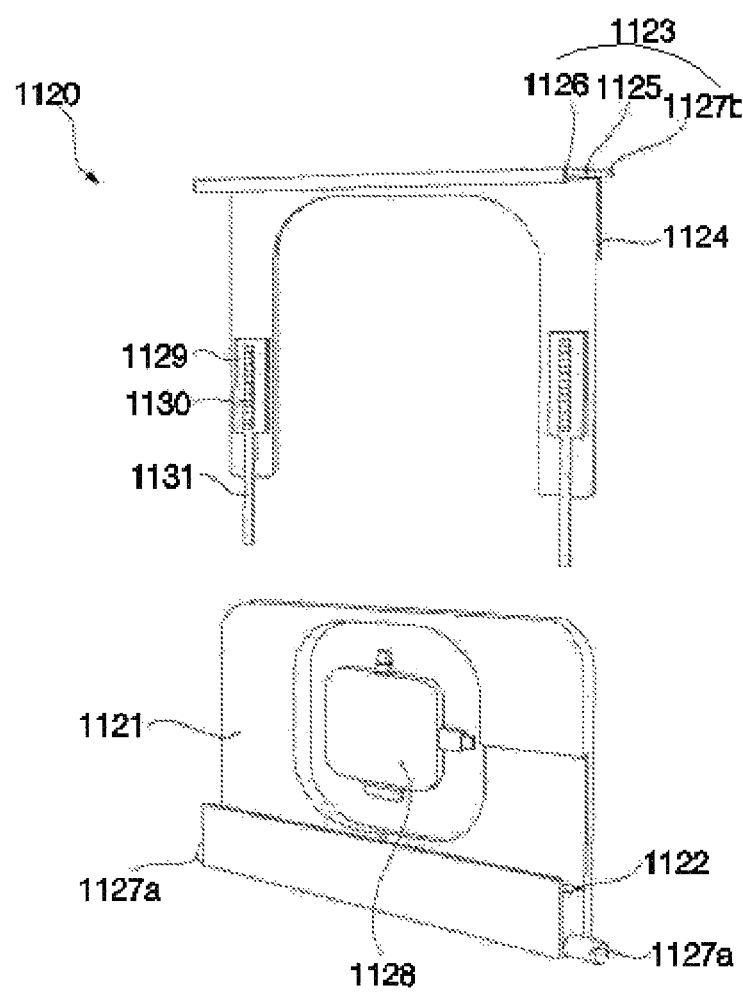
FIGS. 25A and 25B are exploded perspective views illustrating a front surface portion and a rear surface portion of the mobile terminal attachment unit of FIG. 24.
Figure 25B:
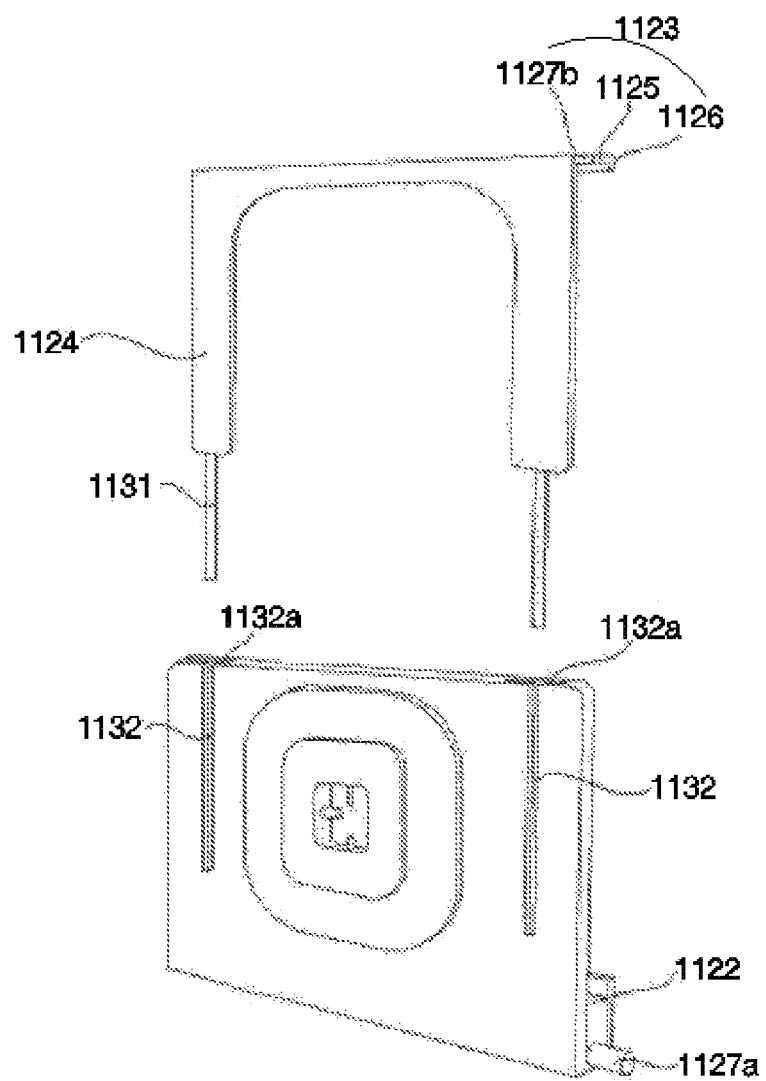

FIGS. 25A and 25B are exploded perspective views illustrating a front surface portion and a rear surface portion of the mobile terminal attachment unit of FIG. 24.

The mobile terminal connectable vehicular cradle assembly 100 in accordance with the exemplary embodiment of the present invention, as exemplarily illustrated in FIGS. 21 to 25B, includes a cover unit 1110, which opens or closes the accommodation space 40 defined inside a dashboard panel 1 by pivoting, a mobile terminal attachment unit 1120, which is moved in connection with the cover unit 1110 so as to be exposed outward or to be accommodated in the accommodation space 40, and guide units 1140, which are located so as to be hidden in the accommodation space 40 and serve to guide the movement of the mobile terminal attachment unit 1120.

Here, the dashboard panel 1, as is generally well known, is a member that is located between the front side of the driver's seat and the front passenger seat (not illustrated) and the front windshield glass (not illustrated) of the vehicle, and serves to provide a place for the installation of a plurality of functional operating units in the vehicle.

The cover unit 1110 is normally hidden and constitutes part of the external appearance of the dashboard panel 1, and pivots to enter a pop-up mode from the dashboard panel 1 so as to outwardly expose the mobile terminal attachment unit 1120 in order to allow the user to easily mount the mobile terminal 20 thereto.

When defining the "rear end" as facing the front seats and the "front end" as facing the front windshield glass on the basis of the vehicle body, the cover unit 1110 may gradually open or close the accommodation space 40 as the rear end of the cover unit 1110 pivots upward or downward about a pivot point 1111 located at the front end of the cover unit 1110.

With regard to the dashboard panel 1, a rounded portion thereof that faces rearward and downward may be selected as the position of the mobile terminal connectable vehicular cradle assembly 100 in accordance with the present invention, in order to ensure that the mobile terminal 20 may be properly attached to the mobile terminal connectable vehicular cradle assembly 100 despite the short upward and downward pivoting distance of the cover unit 1110.

Meanwhile, in the exemplary embodiment of the mobile terminal connectable vehicular cradle assembly 100 in accordance with the present invention, the mobile terminal 20 may be implemented in various forms. For example, the mobile terminal 20 may correspond to all of wireless communication devices, which can perform wireless communication via, for example, mobile communication networks and Bluetooth communication, such as, for example, a cellular phone, smart phone, notebook computer, digital broadcast terminal, personal digital assistant (PDA), portable multimedia player (PMP), or tablet PC.

Once the mobile terminal, which can perform wireless communication as described above, has been disposed on the mobile terminal attachment unit 1120, the mobile terminal attachment unit 1120 may be inserted into the accommodation space 40 so that both the mobile terminal 20 and the mobile terminal attachment unit 1120 are accommodated inside the dashboard panel 1 to thereby be hidden by the cover unit 1110.

More specifically, as exemplarily illustrated in FIGS. 23A and 23B, when the accommodation space 40 is closed, the mobile terminal attachment unit 1120 may be tilted rearward and upward so as to be accommodated in the accommodation space 40. When the accommodation space 40 is open, the mobile terminal attachment unit 1120 is vertically oriented so as to allow the driver and the passenger(s) to easily observe the display on the front side of the mobile terminal 20 disposed thereon without the interference of light.

In particular, the mobile terminal attachment unit 1120 may be in the rearwardly and upwardly tilted state described above when accommodated in the accommodation space 40. Thereby, the mobile terminal attachment unit 1120 may be efficiently accommodated without occupying much space inside the dashboard panel 1.

Meanwhile, the mobile terminal attachment unit 1120 may be shaped to allow the mobile terminal 20 having any of various sizes to be attached thereto and supported thereby.

To this end, the mobile terminal attachment unit 1120 may include a support panel 1121, which is configured to come into close contact with the rear surface of the mobile terminal 20, a support unit 1122, which is located at the lower end of the support panel 1121 and is configured to allow the lower end of the mobile terminal 20 to be seated therein, and a binding unit 1123, which is vertically movably located at the upper end of the support panel 1121 and is configured to support the upper end of the mobile terminal 20.

The support unit 1122 is configured such that a seating base is provided with a holder portion.

The binding unit 1123 is firstly upwardly moved by the user to allow the mobile terminal 20, having any of various sizes, to be easily seated on the support unit 1122 without interference, and is subsequently downwardly moved by the user so as to support the upper end of the mobile terminal 20 once the mobile terminal 20 has been seated in the support unit 1122. A detailed description thereof will follow.

The support panel 1121 may form the framework of the mobile terminal attachment unit 1120, and may be integrally formed at the lower end thereof with the support unit 1122. The support unit 1122 affixed to the lower end of the support panel 1121 takes the form of a gutter, the top of the front side of which is open. The binding unit 1123 is vertically movably coupled to the rear surface of the support panel 1121 as described above.

Although not illustrated, the support unit 1122 having the form of a gutter may have a variable front-and-rear dimension in order to allow the mobile terminal 20 having any of various thicknesses to be firmly seated therein.

Meanwhile, the binding unit 1123, as exemplarily illustrated in FIGS. 25A and 25B, may include a coupling portion 1124, which is movably coupled to the rear surface of the support panel 1121, a bent portion 1125, which is bent to the lateral rear side of the mobile terminal 20 from the upper end of the coupling member 1124, and a holder portion 1126, which is bent downward from the tip end of the bent portion 1125.

The support panel 1121 may support a third portion of the mobile terminal.

Meanwhile, the holder portion 1126 and the bent portion 1125 may be referred to as a holder structure.

Figure 26A:
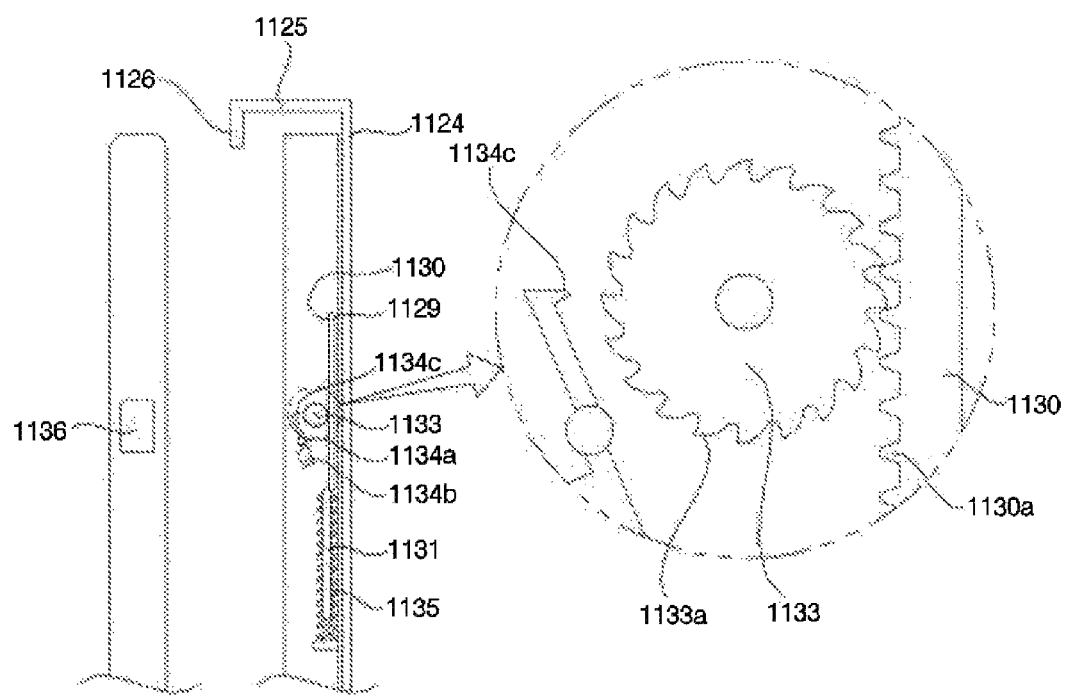
FIGS. 26A to 26C are sectional views and a detailed view illustrating a locking unit included in the mobile terminal attachment unit 1120 of FIG. 24.
Figure 26B:
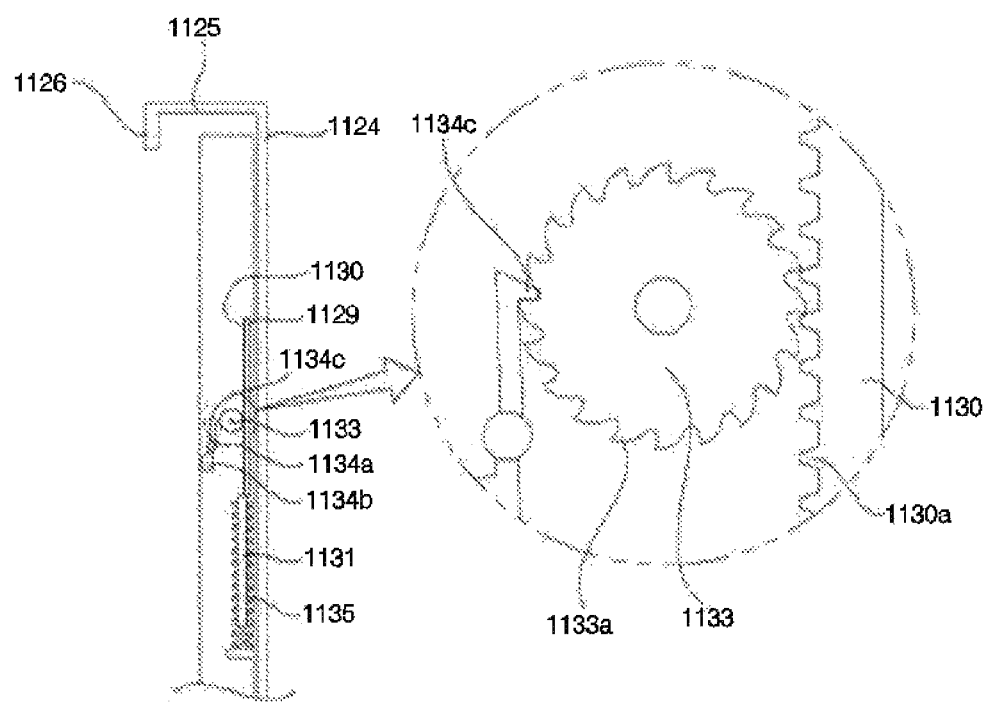
Figure 26C:
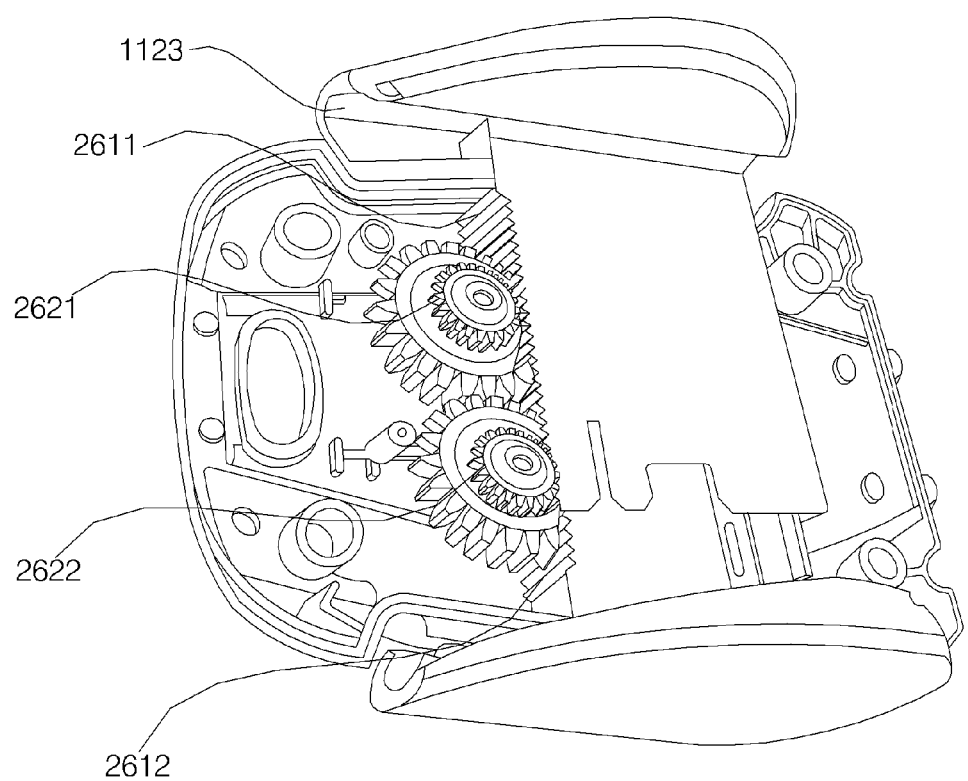

FIGS. 26A to 26C are sectional views and a detailed view illustrating a locking unit included in the mobile terminal attachment unit 1120 of FIG. 24.

The coupling portion 1124 serves to intermediate the coupling of the binding unit 1123 in relation to the support panel 1121. As exemplarily illustrated in FIG. 25A, guide panels 1129 are affixed to the front surface of the coupling portion 1124 so as to protrude toward the support panel 1121. The guide panels 1129 are configured so as to be inserted into the support panel 1121, thus serving to guide the upward or downward movement of the binding unit 1123.

The support panel 1121 has insertion holes 1132a formed in the top surface thereof to allow the respective guide panels 1129 to be inserted in the vertical movement direction. Once the guide panels 1129 has been inserted into the insertion holes 1132a, as exemplarily illustrated in FIGS. 26A and 26B, the guide panels 1129 guide the vertical movement of the binding unit 1123 while being in contact with the rear wall surface of the support panel 1121 that defines the inner space of the support panel 1121.

Meanwhile, a vertically elongated guide rod 1131 may be formed at the lower end of each guide panel 1129 as exemplarily illustrated in FIGS. 26A and 26B. The guide rod 1131 is inserted into the inner space of the support panel 1121, and is configured to elastically support the binding unit 1123 in the upward direction owing to an elastic body 1135 fitted around the outer circumference thereof. Here, the elastic body 1135 may be a spring fitted around the outer circumference of the guide rod 1131 without being limited thereto. Of course, any other elastic member may be employed, so long as it can elastically support the binding unit 1123 in the upward direction.

The mobile terminal attachment unit 1120 may further include a locking unit (not designated by a reference numeral, see reference numerals 1129 to 1134), which limits the elastic movement of the binding unit 1123 caused by the elastic body 1135.

The locking unit, as exemplarily illustrated in FIGS. 26A and 26B, may include a rack gear 1130, which is disposed on one surface of the binding unit 1123 and extends lengthwise in the movement direction of the binding unit 1123, a stopping pinion 1133, which is provided with pinion gear teeth 1133a configured to be rotatably engaged with rack gear teeth of the rack gear 1130, a pivoting member 1134, which is pivotably disposed so as to be brought into close contact with the stopping pinion 1133 by prescribed elastic support force and is configured so as to be caught by one-way limiting gear teeth 1133a (designated by the same reference numeral as the pinion gear teeth) formed on the stopping pinion 1133 so that the pivoting thereof is prevented in a given direction by the stopping pinion 1133, and an unlock button 1136, which selectively releases a gear catch piece 1134c of the pivoting member 1134.

Here, the rack gear teeth of the rack gear 1130 may be integrally formed on the front surface of the guide panel 1129 so as to extend lengthwise in the vertical direction. The rack gear teeth may be configured as recesses indented in the front surface of the guide panel 1129. Of course, the rack gear teeth may be configured as ridges formed on the front surface of the guide panel 1129.

In the exemplary embodiment of the present invention, the pinion gear teeth 1133a of the stopping pinion 1133, as exemplarily illustrated in FIGS. 26A and 26B, may serve as one-way limiting gear teeth, which are caught by one gear catch piece 1134c of the pivoting member 1134, which is located in the direction in which the pinion gear teeth 1133a of the stopping pinion 1133 are rotated, when the rack gear 1130 is elastically moved in the upward direction. Although the pinion gear teeth 1133a of the stopping pinion 1133 may also be caught by the opposite gear catch piece of the pivoting member 1134, in this case, certain slippage may occur. However, the pinion gear teeth 1133a of the stopping pinion 1133 need not be limited to the one-way limiting gear teeth that are caught in a given direction by the pivoting member 1134, and any other shape may be employed so long as it may be easily caught in a given direction by the pivoting member 1134.

The gear catch piece 1134c of the pivoting member 1134, which forms the upper end above a rotation center point 1134a, may be caught by the one-way limiting gear teeth 1133a, and a lower end 1134b of the pivoting member 1134 may be guided by the guide units 1140 (not illustrated). The rotation center point 1134a may be elastically supported by an elastic body (not illustrated) in the direction in which the pivoting member 1134 is caught by the pinion gear teeth 1133a.

Meanwhile, the pivoting member 1134 may receive power from the drive unit (630 in FIG. 5). A power transmission mechanism (e.g. one or more gears) may be located between the pivoting member 1134 and the drive unit (630 in FIG. 5). The gear catch piece 1134c may be caught by the one-way limiting gear teeth 1133a by being pivoted by the power provided from the drive unit (630 in FIG. 5).

Meanwhile, the drive unit (630 in FIG. 5), as described above, may provide driving power when the mobile terminal 20 is authenticated in the state in which the mobile terminal 20 is electrically connected to the vehicle 10.

When the user pushes the unlock button 1136 provided on one side surface of the support panel 1121 in order to upwardly move the binding unit 1123 prior to seating the mobile terminal 20 in the support unit 1122, as exemplarily illustrated in FIG. 26A, the pivoting member 1134 is spaced apart from the one-way limiting gear teeth 1133a of the stopping pinion 1133. At this time, as the elastic member 1135 applies upward elastic support force to the binding unit 1123, the binding unit 1123 is automatically moved upward so as to be spaced apart from the support unit 1122, thereby allowing the mobile terminal 20 having any of various sizes to be inserted into the space between the support unit 1122 and the holder portion 1126 of the binding unit 1123.

Once sufficient space has been created between the support unit 1122 and the holder portion 1126, after inserting the mobile terminal 20 so as to be supported by the support unit 1122, the user may push the binding unit 1123 downward so that the holder portion 1126 is positioned to suit the vertical size of the mobile terminal 20 so as to catch the upper end of the mobile terminal 20. At this time, as exemplarily illustrated in FIG. 26B, slippage between the gear catch piece 1134c of the pivoting member 1134 and the one-way limiting gear teeth 1133a occurs, which may assist the user in stably installing the mobile terminal 20 with an appropriate sense of manipulation.

The unlock button 1136 serves to move the pivoting member 1134 away from the one-way limiting gear teeth 1133a when being pushed by the user, and to return the pivoting member 1134 to the original position when the push force of the user is removed. Here, the pivoting member 1134, as described above, is elastically supported at the center thereof by the elastic body 1135 in the direction in which it is caught by the one-way limiting gear teeth 1133a. Therefore, the unlock button 1136 may temporarily release the elastic support force of the elastic body 1135, or may pivot the pivoting member 1134 in the direction opposite the direction in which the elastic support force is applied.

In addition, the binding unit 1123 may be elastically supported downward by an elastic body. Specifically, the guide rod 1131 is inserted into the inner space of the support panel 1121, and an elastic body (not illustrated) is fitted around the outer circumference of the guide rod 1131 so as to elastically support the binding unit 1123 downward. Here, the elastic body may be a spring fitted around the outer circumference of the guide rod 1131 without being limited thereto, and any other elastic element may be employed so long as it can elastically support the binding unit 1123 downward.

At this time, before the user seats the mobile terminal 20 in the support unit 1122, the binding unit 1123 is located at a lower position upon receiving the downward elastic support force of the elastic body applied thereto. When the user attempts to seat the mobile terminal 20 in the support unit 122, the user may manually move the binding unit 1123 upward so that the mobile terminal 20 having any of various sizes may be inserted into the space between the support unit 1122 and the holder portion 1126 of the binding unit 1123.

Once sufficient space has been created between the support unit 1122 and the holder portion 1126, after inserting the mobile terminal 20 into the support unit 1122, the user may no long grip the binding unit 1123, causing the binding unit 1123 to be moved downward by the elastic support force of the elastic body. Thereby, the holder portion 1126 is positioned to suit the vertical size of the mobile terminal 20, thereby catching the upper end of the mobile terminal 20.

In the present embodiment, although the support unit 1122 has been described as a mobile terminal seating structure by way of example, the seating base not provided with the holder portion may be provided.

Referring to FIG. 26C, the binding unit 1123 may be connected to a first rack gear 2611. The first rack gear 2611 may be engaged with a first pinion gear 2621.

The support unit 1122 may be connected to a second rack gear 2612. The second rack gear 2612 may be engaged with a second pinion gear 2622.

Here, the first rack gear 2611, the second rack gear 2612, the first pinion gear 2621, and the second rack gear 2622 may be referred to as a power transmission mechanism.

Meanwhile, the gear catch piece (620 in FIG. 5) may be provided so as to be caught by any one of teeth of the first pinion gear 2621 or any one of teeth of the second pinion gear 2622.

The gear catch piece (620 in FIG. 5) may include the finger (621 in FIG. 5) to catch any one of the teeth of the first pinion gear 2621 or any one of the teeth of the second pinion gear 2622. The finger (621 in FIG. 5) may be formed to fix any one of the teeth of the first pinion gear 2621 or any one of the teeth of the second pinion gear 2622. For example, the finger 621 may have a bent shape so that it is bent toward the first pinion gear 2621 or the second pinion gear 2622.

The gear catch piece (620 in FIG. 5) may be moved by the moving power provided from the drive unit (630 in FIG. 5).

Figure 27A:
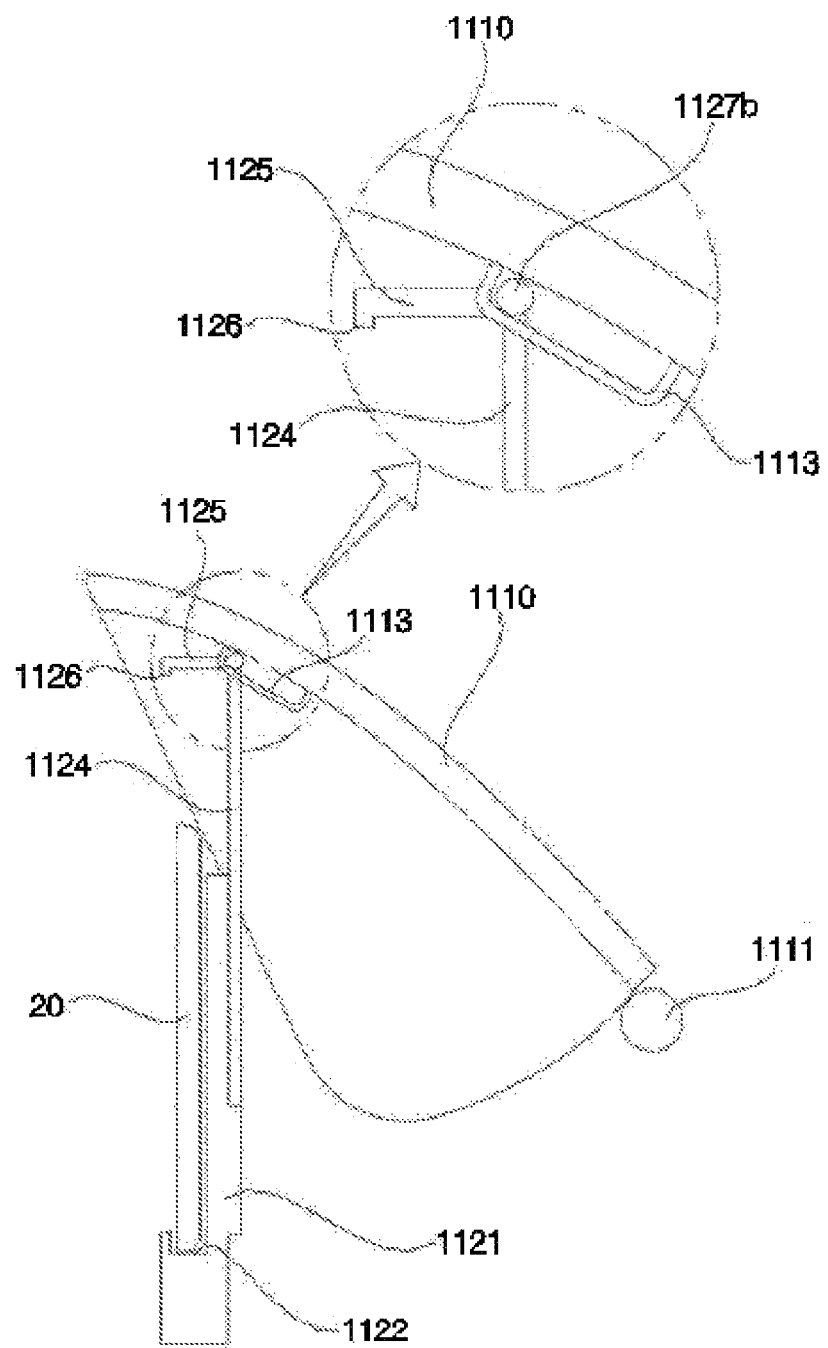
FIGS. 27A and 27B are side views illustrating the connection relationship and the operating relationship between a cover unit 1110 and the mobile terminal attachment unit 1120 of FIG. 21.
Figure 27B:
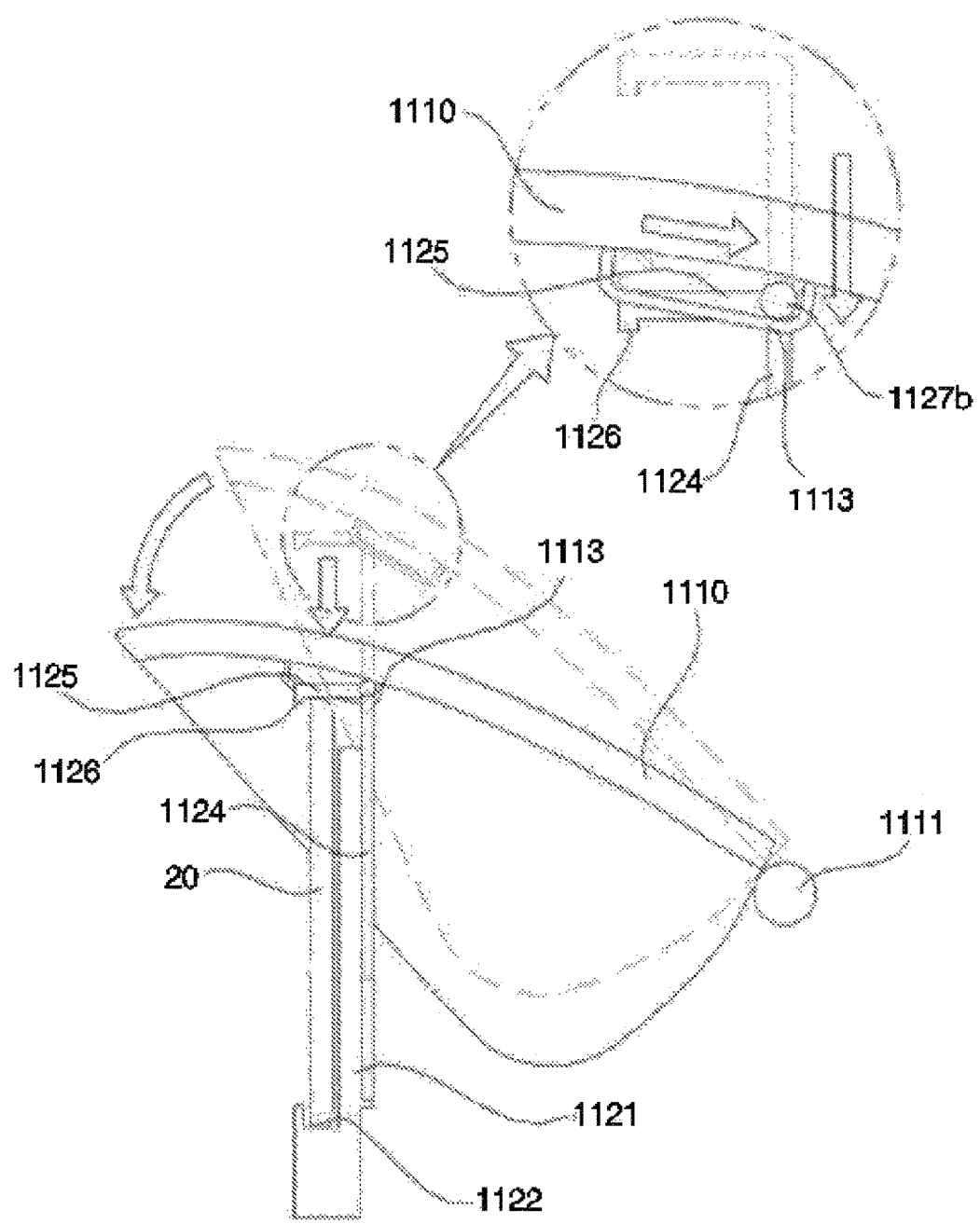

FIGS. 27A and 27B are side views illustrating the connection relationship and the operating relationship between the cover unit 1110 and the mobile terminal attachment unit 1120 of FIG. 21.

The mobile terminal attachment unit 1120 is moved in connection with the cover unit 1110. To this end, the mobile terminal attachment unit 1120 may be connected at the upper end thereof to the inner surface of the cover unit 1110.

More specifically, as exemplarily illustrated in FIGS. 27a and 27b, in the configuration of the binding unit 1123, a pair of upper end connection rods 1127b may extend from the left and right sides of the upper end of the coupling portion 1124 by a prescribed distance in the width direction of the support panel 1121 so as to intermediate the connection between the mobile terminal attachment unit 1120 and the inner surface of the cover unit 1110. The upper end connection rods 1127b may be arranged respectively at the left and right sides of the upper end of the coupling portion 1124.

Meanwhile, the cover unit 1110 may have a pair of orbital rings 1113 formed in the inner side surfaces thereof so that the upper end connection rods 1127b are respectively inserted into the orbital rings 1113.

As the upper end connection rods 1127b are inserted into the respective orbital rings 1113, the upper end of the mobile terminal attachment unit 1120 may be connected to the inner surface of the cover unit 1110.

Here, the orbital ring 1113 may have a curved orbit to allow the upper end connection rod 1127b to move by a prescribed distance along the inner side surface of the cover unit 1110 and to allow the cover unit 1110 to pivot by a prescribed angle about the pivot point 1111 that is the pivoting center when the binding unit 1123 is moved downward on the support panel 1121.

More specifically, the upper end of the mobile terminal attachment unit 1120, as described above, is oriented vertically perpendicular to the inner surface of the cover unit 1110 when the cover unit 1110 is opened, and then is tilted upward and rearward inside the accommodation space 40 when the cover unit 1110 is closed. At this time, the mobile terminal attachment unit 1120 is moved in connection with the cover unit 1110. Any one point on the rear end of the cover unit 1110 needs to pivot at the same radius from the pivot point 1111 at the front end of the cover unit 1110. In particular, there is a precondition that the portion of the upper end connection rod 1127*b* that is connected to the upper end of the mobile terminal attachment unit 1120 does not interfere with the pivoting of the cover unit 1110 while the mobile terminal attachment unit 1120 is moving. Here, the orbital rings 1113 described above may satisfy this precondition owing to the curved orbit, which allows the cover unit 1110 to pivot more smoothly when the mobile terminal attachment unit 1120 moves.

For example, each of the upper end connection rods 1127*b* is located close to the rear end of the orbital ring 1113 when the cover unit 1110 is opened as exemplarily illustrated in FIG. 27A, and is located close to the front end of the orbital ring 1113 when the cover unit 1110 is closed as exemplarily illustrated in FIG. 27B. The upper end connection rod 1127*b* is moved along the inner surface of the cover unit 1110 while being located inside the orbital ring 1113.

In the state described above, when the user brings the mobile terminal 20 into close contact with the front surface of the support panel 1121 and moves the binding unit 1123 downward based on the size of the mobile terminal 20 so that the upper end of the mobile terminal 20 is caught by the holder portion 1126, the cover unit 1110 also pivots downward according to the movement of the mobile terminal attachment unit 1120. Therefore, a constant distance between the cover unit 1110 and the upper end of the installed mobile terminal 20 may be maintained regardless of the size of the mobile terminal 20 that is installed. By maintaining the constant distance between the cover unit 1110 and the upper end of the installed mobile terminal 20, the external appearance of the installed product may be maintained consistently regardless of the kind of mobile terminal 20 that is attached for connection with the internal system of the vehicle.

Figure 28A:
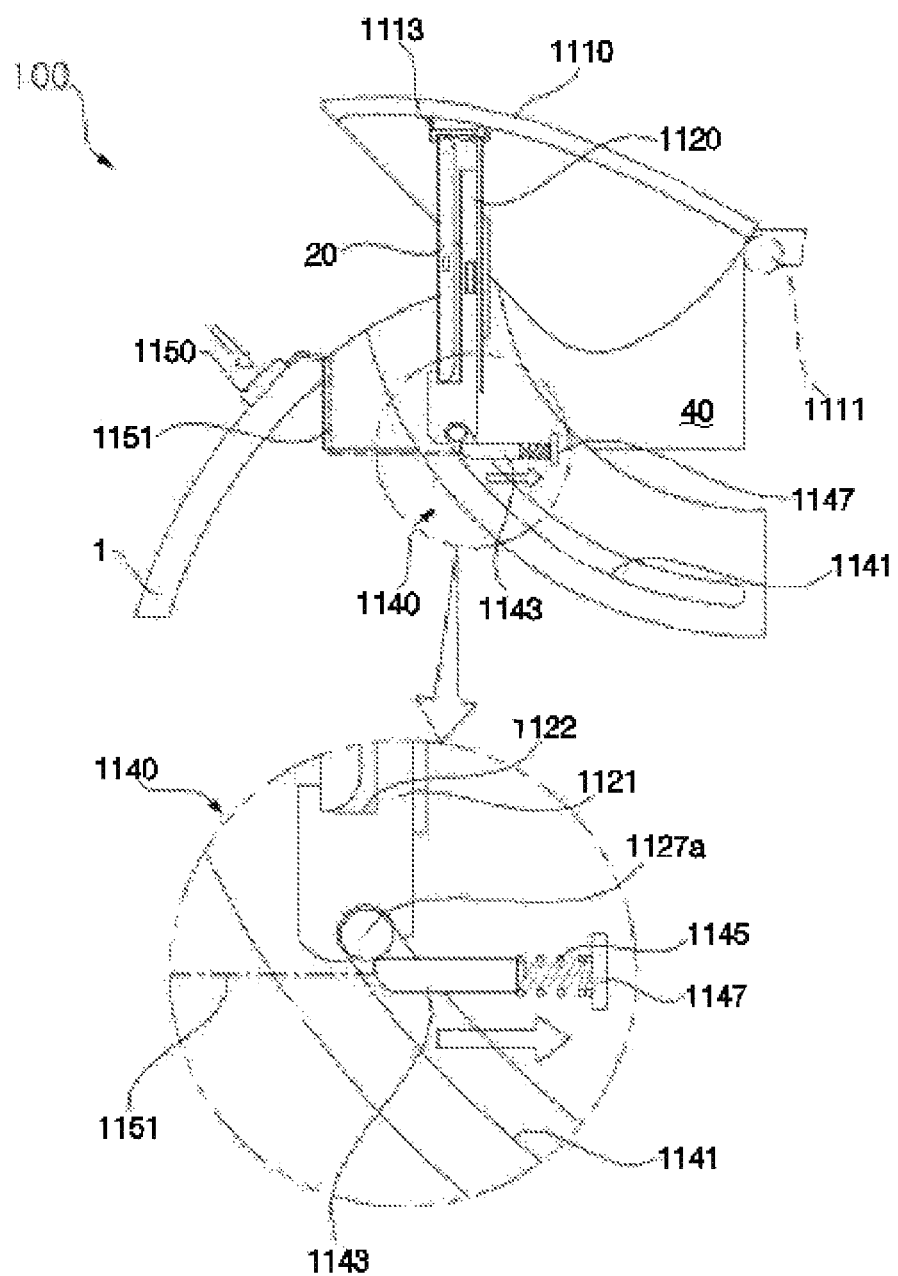
FIGS. 28A and 28B are side views illustrating the connection relationship and the operating relationship between a guide unit 1140 and the mobile terminal attachment unit 1120 of FIG. 21.
Figure 28B:
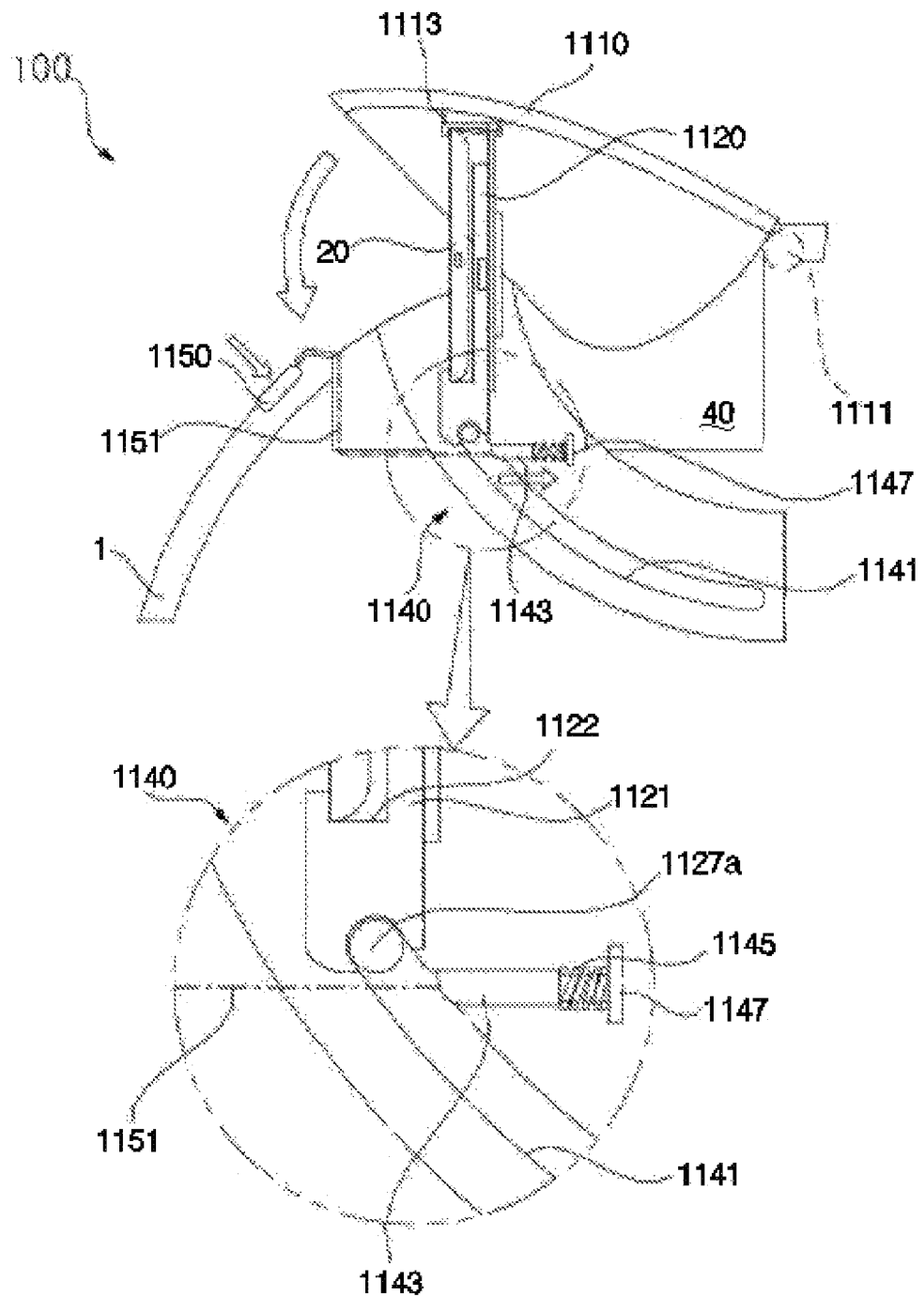

FIGS. 28A and 28B are side views illustrating the connection relationship and the operating relationship between the guide unit 1140 and the mobile terminal attachment unit 1120 of FIG. 21.

The mobile terminal attachment unit 1120 is connected to the guide units 1140 so that the movement of the mobile terminal attachment unit 1120 is guided by the guide units 1140. In particular, the mobile terminal attachment unit 1120 may be connected at the lower end thereof to the guide units 1140.

More specifically, as exemplarily illustrated in FIGS. 28A and 28B, in the configuration of the mobile terminal attachment unit 1120, a pair of lower end connection rods 1127*a* may extend from the left and right sides of the lower end of the support panel 1121 by a prescribed distance in the width direction of the support panel 1121 so as to intermediate the connection between the guide units 1140 and the mobile terminal attachment unit 1120. The lower end connection rods 1127*a* may be arranged respectively at the left and right sides of the lower end of the support panel 1121.

As the respective lower end connection rods 1127*a* are inserted into the guide units 1140 adjacent thereto, the lower end of the mobile terminal attachment unit 1120 is connected to the guide units 1140.

Meanwhile, each of the guide units 1140, as exemplarily illustrated in FIGS. 28A and 28B, may include a guide slot 1141 formed to guide the movement of the lower end of the support panel 1121 according to the movement of the mobile terminal attachment unit 1120.

Here, the guide slots 1141 formed in the guide units 1140 may have the same circumference about the pivot point 1111, which is the pivoting center of the cover unit 1110. When the guide slots 1141 are curved to have the same circumference about the pivot point 1111, which is the pivoting center of the cover unit 1110, the front-and-rear length of the orbital rings 1113 described above may be minimized, and the lower end of the mobile terminal attachment unit 1120 may be integrally formed with the cover unit 1110 even when the cover unit 1110 and the upper end of the mobile terminal attachment unit 1120 interfere with each other inside the orbital rings 1113, and thus the mobile terminal attachment unit 1120 cannot move smoothly. With this integrated configuration, the movement of the mobile terminal attachment unit 120 may be naturally guided without interference.

Meanwhile, the guide slot 1141 is tilted rearward and upward, and the guide unit 1140 may further include a stopper unit (not designated by a reference numeral, see reference numerals 1143, 1147, 1150 and 1151), which supports the lower end of the support panel 1121, which has moved to a top dead center position of the guide slot 1141 so as to resist gravity.

The stopper unit, as exemplarily illustrated in FIGS. 28A and 28B, is provided to protrude into the moving path of the lower end of the support panel 1121, and more specifically, to protrude into the moving path of the lower end connection rods 1127*a*. The stopper unit may be positioned to interfere with the movement only of the lower end connection rods 1127*a*, rather than being positioned to interfere with the movement of the support panel 1121.

The stopper unit may include a stopping block 1143, which protrudes into the moving path of the lower end connection rods 1127*a*, an elastic member 1145, which applies prescribed elastic force to the stopping block 1143 so as to elastically support the stopping block 1142 toward the moving path, and a button 1150, which separates the stopping block 1142 from the moving path in response to user selection. The elastic member 1145 may be supported by a support plate 1147, which is provided inside the accommodation space 40.

Here, the portion of the stopping block 1143 that comes into contact with the lower end connection rod 1127*a* may be rounded so that the stopping block 1143 is located in the moving path when the cover unit 1110 is opened and the mobile terminal attachment unit 1120 is moved to the top dead center position of the guide unit 1140, and is then pushed in the direction opposite the direction in which it is elastically supported by the elastic member 1145 by coming into contact with the lower end connection rod 1127*a*.

The lower end connection rod 1127*a* enters the gap between the rounded portion of the stopping block 1143 and the inner wall surface of one side of the guide slot 1141 when the mobile terminal attachment unit 1120 is moved to the top dead center position of the guide slot 1141, thereby pushing the stopping block 1143 in the direction opposite the direction in which it is elastically supported so as to forcibly separate the stopping block 1143 from the moving path.

Thereafter, when the lower end connection rod 1127a reaches the top dead center position, the stopping block 1143, which is released from interference with the lower end connection rod 1127a, is returned to the moving path of the guide slot 1141 by the elastic force of the elastic member 1145, thereby supporting the mobile terminal attachment unit 1120 so as to resist gravity.

Meanwhile, although not illustrated in detail in FIGS. 28A and 28B, the button 1150 serves as a closure switch, which separates the stopping block 1143, which supports the mobile terminal attachment unit 1120 so as to resist gravity, from the moving path, thereby causing the mobile terminal attachment unit 1120 to sag downward along the guide slot 1141 due to gravity and pivoting and closing the cover unit 1110.

A connection structure 151 may be provided between the button 1150 and the stopping block 1143 to allow the stopping block 1143 to separate from the moving path when the button 1150 is pushed. The connection structure 151 may be a mechanical link structure, and as needed, may be a solenoid structure, which moves the stopping block 1143 using an electrical signal generated via the operation of the button 1150.

Considering the movement of the mobile terminal attachment unit 1120 under the guidance of the guide unit 1140 configured as described above, as exemplarily illustrated in FIG. 28A, the lower end connection rod 1127a, formed at the lower end of the support panel 1121, is supported by the top dead center position of the guide slot 1141 by the stopping block 1143 of the stopper unit when the cover unit 1110 is opened. Then, when the user pushes the button 1150, as exemplarily illustrated in FIG. 28B, the mobile terminal attachment unit 1120 slides downward under the guidance of the guide slot 1141 as the stopping block 1143 is separated from the moving path.

In an exemplarily embodiment of the present invention, the mobile terminal connectable vehicular cradle assembly 100 may be configured such that an elastic member 1145 (not illustrated) is provided at the pivot point 1111 which is the pivoting center of the cover unit 1110 and such that the elastic member (not illustrated) may apply prescribed elastic force in the direction in which the cover unit 1110 is opened.

In addition, in an exemplarily embodiment of the present invention, although not illustrated, the mobile terminal connectable vehicular cradle assembly 100 may further include an absorber member configured to absorb the pivoting force in the direction in which the cover unit 1110 is opened.

The absorber member serves to prevent the generation of noise by absorbing the pivoting force of the cover unit 1110 when the cover unit 1110 is opened by the elastic force of the elastic member 1145 described above.

The absorber member may absorb the pivoting force of the cover unit 1110 in a hydraulic manner, and may take the form of a gas spring. Generally, the gas spring is configured such that liquid-phase fluid and gas-phase fluid contained therein dampen the force of a dynamic object using variation in shape depending on the force exerted therein so as to resist pressure. In the mobile terminal connectable vehicular cradle assembly 110 in accordance with the present invention, the gas spring is connected at one side thereof to the cover unit 1110 and at the other end thereof to the accommodation space 40 inside the dashboard panel 1, thereby serving to absorb the pivoting force of the cover unit 1110, which is generated when the cover unit 1110 is opened or closed.

More specifically, the user may exert prescribed operating force, which is initial operating force, on the cover unit 1110 in order to open the cover unit 1110. Here, the initial operating force may be generated when the user pushes the closed cover unit 1110 and then removes the pushing force. The cover unit 1110 may be configured to change to the open state by being unlocked from the dashboard panel 1 when the user applies a prescribed pushing force in order to input the initial operating force. A detailed description related to the configuration in the state in which the cover unit 1110 is locked in relation to the dashboard panel 1 will be omitted herein.

Because the cover unit 1110, unlocked from the dashboard panel 1, may rapidly pivot so as to be opened by the elastic force of the elastic body provided at the pivot point 1111 which is the pivoting center, the absorber member serves to gradually reduce the speed at which the cover unit 1110 is opened, in order to reduce the generation of noise when the cover unit 1110 is completely opened.

Figure 29:
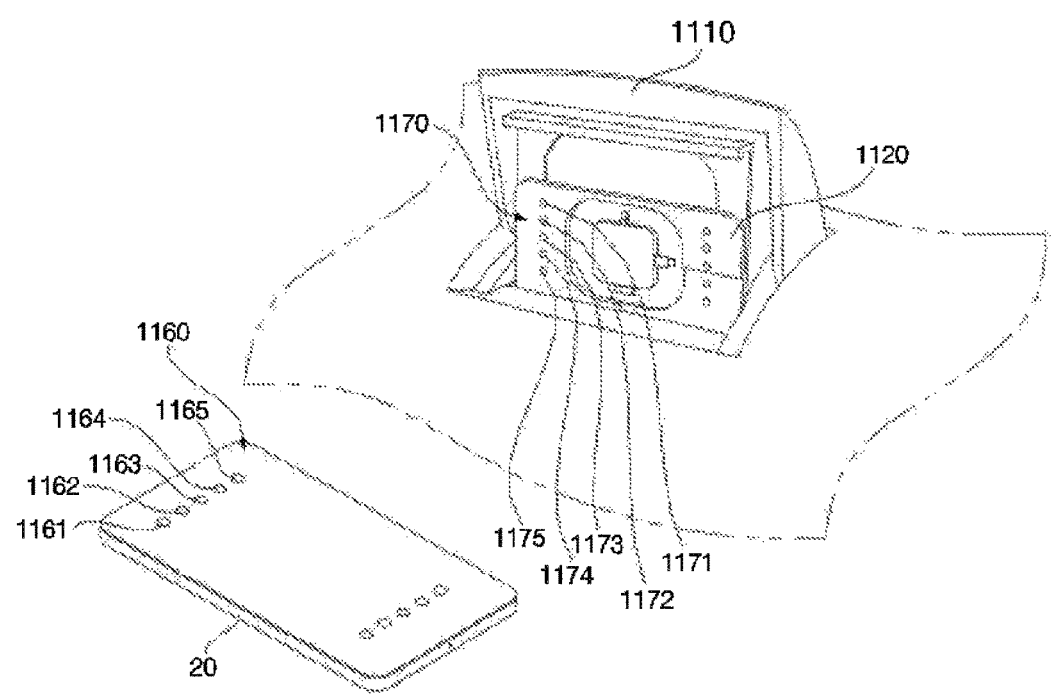
FIG. 29 is a perspective view illustrating correct position holder units 1160 and 1170 of the mobile terminal 20 and the mobile terminal attachment unit 1120.

FIG. 29 is a perspective view illustrating correct position holder units 1160 and 1170 between the mobile terminal 20 and the mobile terminal attachment unit 1120.

When the mobile terminal attachment unit 1120 is exposed outward by moving in a pop-up mode owing to the opening and closing mechanism of the cover unit 1110 as described above, the user mounts his/her mobile terminal on the mobile terminal attachment unit 1120 and connects the mobile terminal to the internal system of the vehicle.

In an exemplary embodiment of the present invention, the mobile terminal connectable vehicular cradle assembly 100 may further include correct position holder units 1160 and 1170, which cause the mobile terminal 20 to be attached to the correct position on the mobile terminal attachment unit 1120 when the occupant mounts the mobile terminal 20 on the mobile terminal attachment unit 1120 in order to drive the vehicle.

The correct position holder units 1160 and 1170, as exemplarily illustrated in FIG. 29, may include a first holder unit 1160 provided on the rear surface of the mobile terminal 20, and a second holder unit 1170 provided on the front surface of the mobile terminal attachment unit 1120.

The first holder unit 1160 and the second holder unit 1170 are comprised of a plurality of groups of magnetic bodies 1161 to 1165 and 1171 to 1175. To allow the left and right sides of the mobile terminal 20 to be attached to correct positions, each of the first holder unit 1160 and the second holder unit 1170 may include a group of magnetic bodies 1161 to 1165 or 1171 to 1175, which are vertically arranged in a line at the left side of the mobile terminal 20 or the mobile terminal attachment unit 1120, and a group of magnetic bodies 1161 to 1165 or 1171 to 1175, which are vertically arranged in a line at the right side of the mobile terminal 20 or the mobile terminal attachment unit 1120.

Among the groups of magnetic bodies 1161 to 1165 or 1171 to 1175 included in each of the first holder unit 1160 and the second holder unit 1170, at least one 1163 or 1173 may be a stronger magnetic body than the other magnetic bodies, i.e. may be a ferromagnetic body. The ferromagnetic bodies 1163 and 1173 substantially serve to set the correct position of the mobile terminal 20 relative to the front surface of the mobile terminal attachment unit 1120. For example, the ferromagnetic body 1163 included in the first holder unit 1160 and the ferromagnetic body 1173 included in the second holder unit 1170 may be an S-pole ferromagnetic body and an N-pole ferromagnetic body, which generate stronger attraction force than the other magnetic bodies.

Although the exemplary embodiment of the present invention has been described under the assumption that the above-described magnetic bodies are permanent magnets, in some embodiments, the magnetic bodies may be electromagnets, and the electromagnets, which correspond to the S-pole and N-pole ferromagnetic bodies among the magnetic bodies described above, are set to create a stronger magnetic field than that created by electromagnets, which correspond to the magnetic bodies other than the ferromagnetic bodies, when the approach of the mobile terminal 20 to the mobile terminal attachment unit 1120 is sensed. In this case, the magnetism of the ferromagnetic body 1173 included in the second holder unit 1170 of the mobile terminal attachment unit 1120 may be changed to be equal to the magnetism of the ferromagnetic body 1163 included in the first holder unit 1160 of the mobile terminal 20, which may enable the mobile terminal 20 to be easily attached to or detached from the mobile terminal attachment unit 1120.

In this way, when the user brings the mobile terminal 20 in proximity to the front surface of the mobile terminal attachment unit 1120, the mobile terminal 20 may be guided so as to be attached to the correct position owing to the groups of magnetic bodies 1161 to 1165 and 1171 to 1175 of the first holder unit 1160 and the second holder unit 1170 even if the user tries to attach the mobile terminal at an incorrect position by mistake, which may improve user convenience and reduce the risk of an accident when the driver tries to mount the mobile terminal 20 on the mobile terminal attachment unit 1120 while driving.

In consideration of the case where the user detaches the mobile terminal 20 from the mobile terminal attachment unit 1120, the support unit, in which the mobile terminal 20 is seated, may have no holder portion in order to ensure easier detachment.

Meanwhile, the first holder unit 1160 may be detachable from the mobile terminal 20, and thus may be configured as a dedicated mounting holder unit for the mobile terminal attachment unit 1120.

Figure 30:
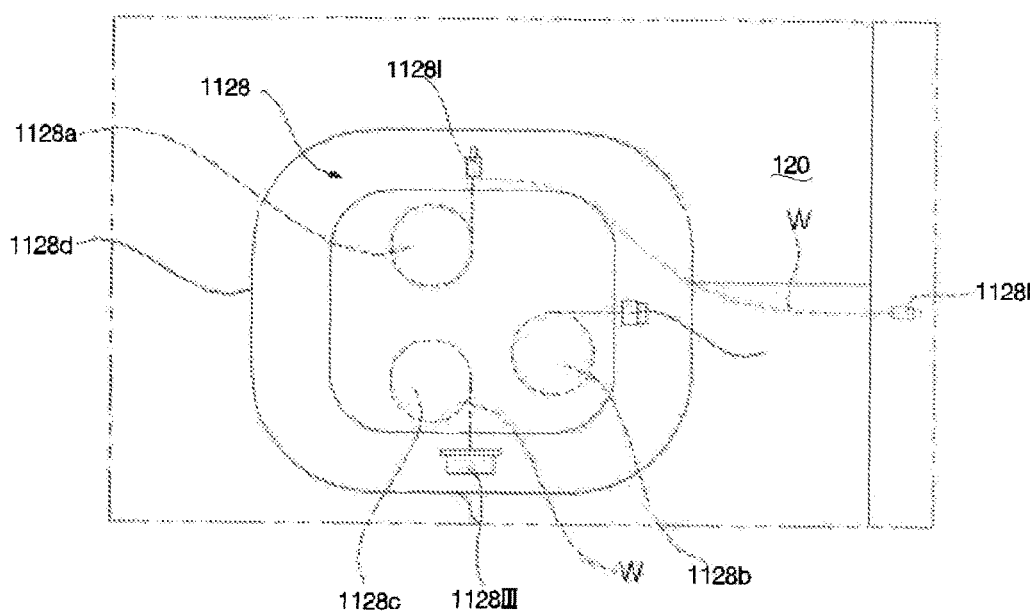
FIG. 30 is a front view illustrating a multi-cable unit of FIG. 21.
Figure 31:
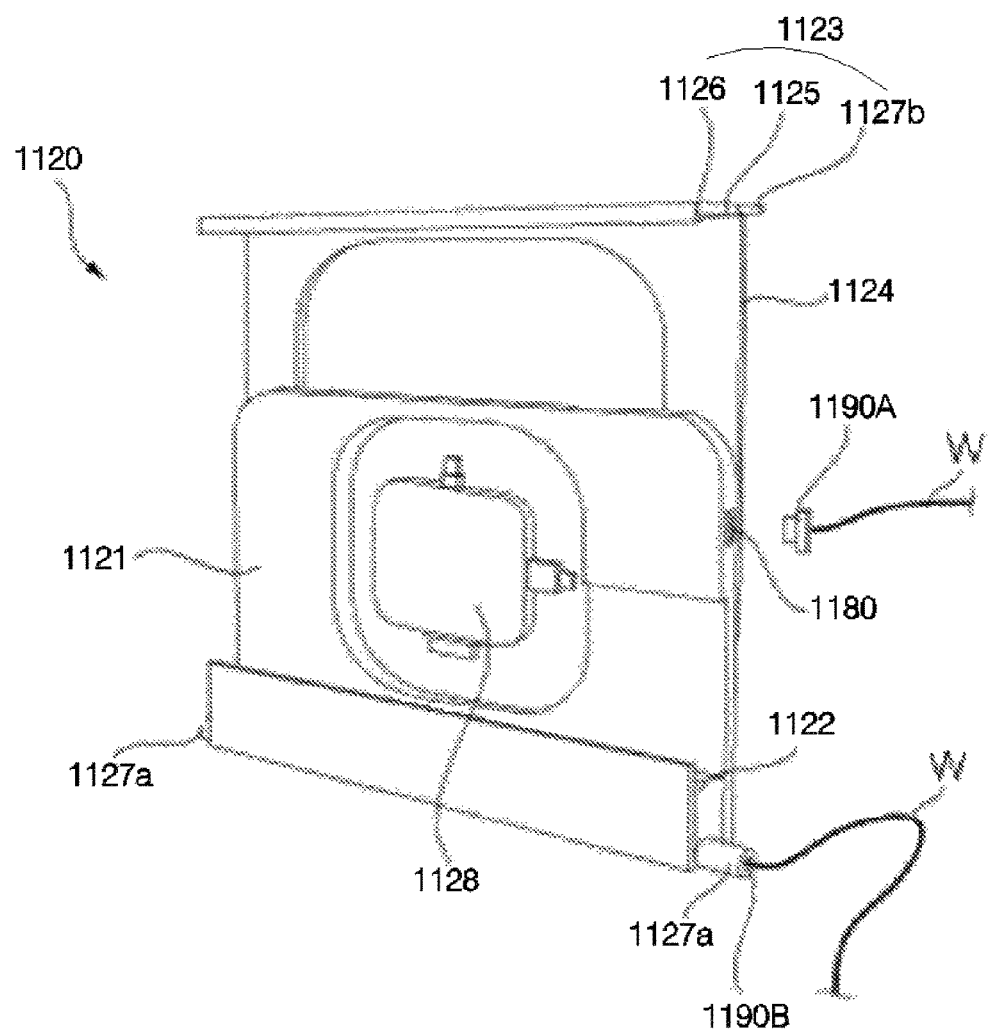
FIG. 31 is a conceptual view illustrating the power connection relationship between the vehicle and the mobile terminal attachment unit 1120.

FIG. 30 is a front view illustrating a multi-cable unit of FIG. 21, and FIG. 31 is a conceptual view illustrating the power connection relationship between the vehicle and the mobile terminal attachment unit 1120.

The multi-cable unit 1128 may accept one or more of connectors.

In an exemplary embodiment of the present invention, the mobile terminal connectable vehicular cradle assembly 100 may further include a pin type power connection cable W, which is any type corresponding to any one of various mobile terminals.

Various pin type power connection lines may be sorted based on the number of pins included in a terminal unit thereof for connection to an electronic appliance. In an exemplary embodiment of the present invention, the mobile terminal connectable vehicular cradle assembly 100 may include a multi-cable unit 1128 to enable at least three kinds of pin type terminals 1128I, 1128II and 1128III, currently available on the market, to be used in common in the mobile terminal connectable vehicular cradle assembly 100.

The multi-cable unit 1128, as exemplarily illustrated in FIG. 30, may be located in a cable receiving recess 1128*d* formed in the center of the front surface of the mobile terminal attachment unit 1120.

The front surface of the mobile terminal attachment unit 1120 may further be provided with a cable discharge recess 1128', through which the cable W is discharged outward from the cable receiving recess 1128*d* without interference with the mounted mobile terminal 20. The cable receiving recess 1128*d* and the cable discharge recess 1128' may be indented to the same depth in the front surface of the mobile terminal attachment unit 1120.

A first pin type cable winding spool 1128*a*, a second pin type cable winding spool 1128*b*, and a third pin type cable winding spool 1128*c* (hereinafter referred to as a plurality of winding spools) are arranged in the cable receiving recess 1128*d* such that only pin type terminals 1128I, 1128II and 1128III thereof are exposed outward and such that a cable cover (not designated by a reference numeral) is formed on the front surface of the mobile terminal attachment unit 1120 so as to shield the remaining parts other than the terminals.

The winding spools 1128*a* to 1128*c* may be configured such that the respective cables W are unwound therefrom and pulled out by the user and are then automatically wound therearound when the user no longer applies force. The respective cables W, which are pulled out from the winding spools 1128*a* to 1128*c* by the user as described above, are discharged outward through the cable receiving recess 1128*d* and the cable discharge recess 1128' without interference with the rear surface of the mobile terminal 20. Thereby, any one of the cables W is inserted into a terminal hole (not designated by a reference numeral) formed in the mobile terminal 20 so as to enable the wired charging of the mobile terminal 20.

The winding spools 1128*a* to 1128*c* may be provided so as to rotate along with the cable cover. The user may rotate the cable cover, and may position the cable winding spools 1128*a*, 1128*b* or 1128*c* such that the one among the pin type terminals 1128I, 1128II and 1128III that suits the terminal hole in the mobile terminal 20 is close to the cable discharge recess 1128. Thereafter, the user may pull out the corresponding cable W for electrical connection with the mobile terminal 20.

Meanwhile, in the mobile terminal connectable vehicular cradle assembly 100 in accordance with an exemplary embodiment of the present invention, as exemplarily illustrated in FIG. 31, power supply connectors 1190A and 1190B and power cables W, which supply power from a power source provided in the vehicle body, may be directly connected to a power source connection hole 1180 formed in the side surface of the mobile terminal attachment unit 1120 and may be terminal-coupled via the lower end connection rod 1127*a* which is formed at the lower end of the mobile terminal attachment unit 1120, so as to ensure the supply of power at ordinary times.

However, although not illustrated in the drawings, in the mobile terminal connectable vehicular cradle assembly 100 in accordance with an exemplary embodiment of the present invention, when a wireless charging receiver is provided in the mobile terminal 20 to enable the wireless charging of the mobile terminal 20, the mobile terminal attachment unit 1120 may include a wireless charging transmitter, so as to enable the mobile terminal 20 to be charged in a wireless manner, rather than a wired manner.

At least one of magnetic induction or magnetic resonance may be adopted as a wireless charging method, but any other charging method may be used so long as it satisfies the wireless charging standard.

As described above, once the mobile terminal 20 has been mounted on the mobile terminal attachment unit 1120, the mobile terminal 20 may be connected with the internal system of the vehicle. When the mobile terminal 20 is connected with the internal system of the vehicle, the mobile terminal 20 automatically switches from a mobile terminal mode to a vehicle mode, which may advantageously allow the user to additionally use smart functions provided by the mobile terminal 20.

Figure 32:
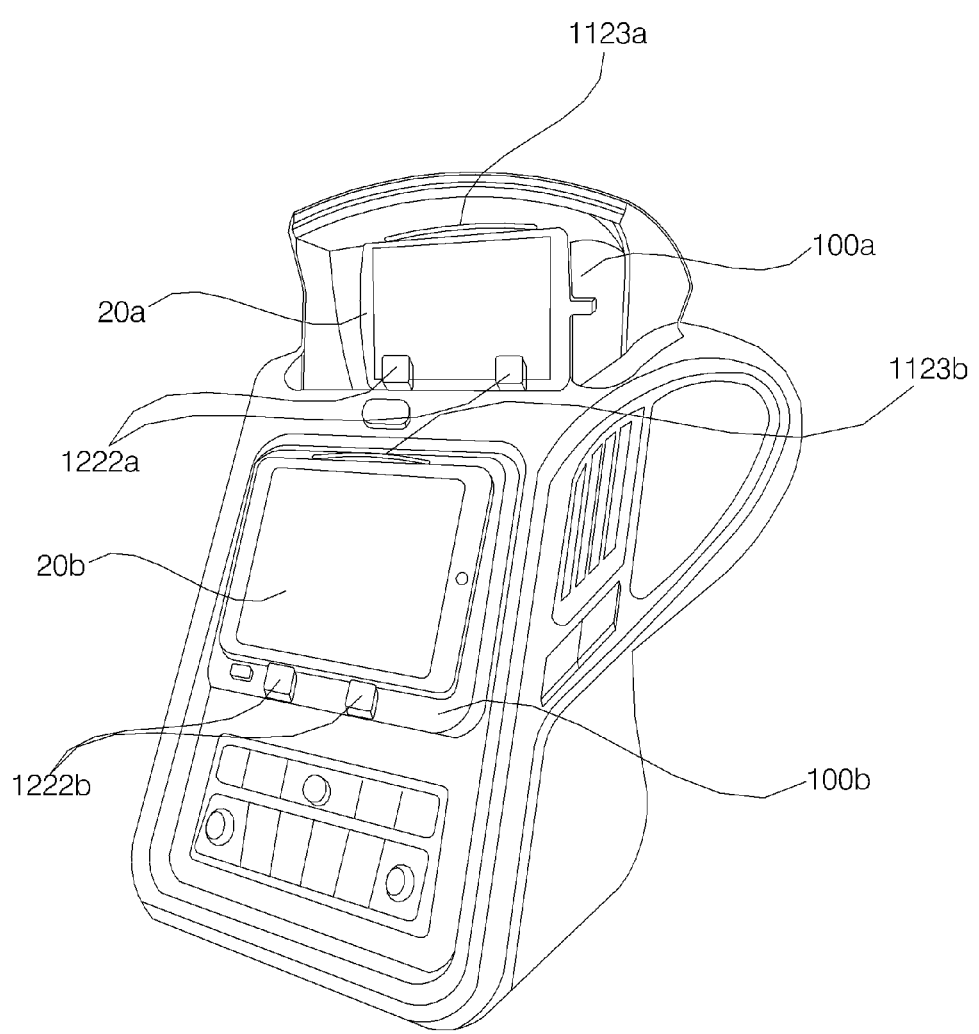
FIG. 32 is a view referenced to explain the position of the mobile terminal connectable vehicular cradle assembly inside the vehicle in accordance with the embodiment of the present invention.

FIG. 32 is a view referenced to explain the position of the mobile terminal connectable vehicular cradle assembly within the vehicle in accordance with the embodiment of the present invention.

Referring to FIG. 32, the mobile terminal connectable vehicular cradle assembly 100 may be located at an arbitrary position on the dashboard as described above with reference to FIGS. 1 to 31. In this case, the mobile terminal connectable vehicular cradle assembly 100 may be located on the upper end of the center fascia.

Meanwhile, the mobile terminal connectable vehicular cradle assembly 100 may be located at the center of the center fascia. In this case, the center fascia may have a space for accommodating the mobile terminal connectable vehicular cradle assembly 100. The space may be defined so as not to limit the movement of a binding unit 1123b included in the mobile terminal connectable vehicular cradle assembly 100. In some embodiments, the mobile terminal connectable vehicular cradle assembly 100 may be formed so as to protrude rearward from the center fascia.

The mobile terminal connectable vehicular cradle assembly 100 may include a rotating member (not illustrated). The rotating member (not illustrated) may be formed on the rear surface of the support panel 1121. The rotating member (not illustrated) may be formed to allow the support panel 1121 to rotate about a prescribed axis. In the state in which the mobile terminal 20 is mounted on the mobile terminal connectable vehicular cradle assembly 100, the mobile terminal 20 may be rotated when the support panel 1121 is rotated. In this case, the user may orient the mobile terminal 20 horizontally or vertically.

Meanwhile, in some embodiments, a plurality of mobile terminal connectable vehicular cradle assemblies may be provided in the vehicle. In this case, a first cradle assembly 100a may be located at an arbitrary position on the dashboard, and a second cradle assembly 100b may be located at an arbitrary position on the center fascia.

A first mobile terminal 20a, which is mounted on the first cradle assembly 100a, may be operated to provide an additional function such as, for example, navigation function. In addition, the first mobile terminal 20a may be operated as an instrument cluster, which displays, for example, the speed of the vehicle, OBD information, and remaining fuel information.

A second mobile terminal 20b, which is mounted on the second cradle assembly 100b, may be operated as an input device that receives input for controlling various devices of the vehicle. For example, the second mobile terminal 20b may be operated as an input device for controlling, for example, an air conditioning device, an AV device, an ADAS device, or various sensors of the vehicle.

As is apparent from the above description, the embodiments of the present invention have one or more effects as follows.

First, it is possible to mount only an authenticated mobile terminal on a cradle assembly for a vehicle capable of connecting with a mobile terminal.

Second, when the mobile terminal is mounted on the mobile terminal connectable vehicular cradle assembly, the mobile terminal may be switched to a vehicle mode so that only an application required for driving is available, which contributes to safe driving.

Third, improved compatibility may be accomplished because various sizes of mobile terminals may be mounted on and connected to the mobile terminal connectable vehicular cradle assembly.

Fourth, the accommodation space defined in the mobile terminal connectable vehicular cradle assembly may be used to store articles when the cradle assembly is not connected to the mobile terminal.

Effects of the present invention should not be limited to the aforementioned effects and other not-mentioned effects will be clearly understood by those skilled in the art from the claims.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternatives uses will also be apparent to those skilled in the art.

What is claimed is:

1. A cradle assembly that couples a mobile terminal with one or more computers of a vehicle, the cradle assembly comprising:
 a binding unit configured to bind a first portion of the mobile terminal, wherein the binding unit is movable between a first position and a second position;
 a support unit configured to support a second portion of the mobile terminal; and
 a locking unit configured to fix the binding unit at the second position based on a signal, from the one or more computers of the vehicle, indicating that the mobile terminal is electrically coupled with the one or more computers of the vehicle,
 wherein the binding unit includes:
  a holder assembly configured to bind the first portion of the mobile terminal, and
  a guide structure that is coupled to the holder assembly and that is configured to guide movement of the holder assembly.

2. The cradle assembly of claim 1, wherein the locking unit comprises:
 a locking mechanism configured to fix the binding unit at the second position; and
 a drive unit configured to operate the locking mechanism based on the signal, from the one or more computers of the vehicle, indicating that the mobile terminal is electrically coupled with the one or more computers of the vehicle.

3. The cradle assembly of claim 2, wherein the locking mechanism includes:
 a gear coupled to the binding unit, the gear having a plurality of teeth; and
 a gear catch piece configured to hold at least one of the plurality of teeth,
 wherein the drive unit is configured to move the gear catch piece to hold at least one of the plurality of teeth based on the signal, by the one or more computers, indicating that the mobile terminal is electrically coupled with the one or more computers of the vehicle.

4. The cradle assembly of claim 2, wherein the drive unit is an electric motor or an electric actuator that uses electric power provided by a power supply of the vehicle.

5. The cradle assembly of claim 2, wherein the drive unit is configured to operate the locking mechanism based on a signal, from the one or more computers of the vehicle, indicating that the mobile terminal is authenticated by the one or more computers of the vehicle.

6. The cradle assembly of claim 1, wherein a position of the holder assembly is adjustable.

7. The cradle assembly of claim 1, wherein the binding unit includes one or more holders and each of the one or more holders binds a different portion of the mobile terminal.

8. The cradle assembly of claim 7, wherein the one or more holders are movable to bind different portions of the mobile device based on one or more characteristics of the mobile terminal.

9. The cradle assembly of claim 8, wherein the one or more characteristics of the mobile terminal include a size of the mobile terminal, a thickness of the mobile terminal, or a weight of the mobile terminal.

10. The cradle assembly of claim 1, wherein the support unit includes one or more holders and each of the one or more holders binds a different portion of the mobile terminal.

11. The cradle assembly of claim 10, wherein the one or more holders are movable to bind different portions of the mobile terminal based on one or more characteristics of the mobile terminal.

12. The cradle assembly of claim 11, wherein the one or more characteristics of the mobile terminal include a size of the mobile terminal, a thickness of the mobile terminal, or a weight of the mobile terminal.

13. The cradle assembly of claim 11, wherein each of the one or more holders includes a friction member.

14. The cradle assembly of claim 1, wherein the support unit includes a pivot point and the support unit is operative to pivot about an axis of the pivot point.

15. The cradle assembly of claim 14, wherein the pivot point includes a pivot shaft and a pivot hole, the pivot shaft pivoting by elastic force.

16. The cradle assembly of claim 1, further comprising a coupling port that couples the one or more computers of the vehicle with the mobile terminal.

17. The cradle assembly of claim 1, further comprising a support panel configured to couple the binding unit with the support unit,
   wherein the support panel is configured to support a third portion of the mobile terminal.

18. The cradle assembly of claim 1, further comprising a multi-cable unit configured to accept one or more types of connectors.

19. The cradle assembly of claim 1, wherein the support unit is fixed to the vehicle.

* * * * *